(12) United States Patent
Oishi

(10) Patent No.: US 7,343,611 B2
(45) Date of Patent: Mar. 11, 2008

(54) DISC CARTRIDGE HAVING DISC TAKING-OUT HISTORY DETECTING PORTION

(75) Inventor: Kengo Oishi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 407 days.

(21) Appl. No.: 11/088,849

(22) Filed: Mar. 25, 2005

(65) Prior Publication Data

US 2005/0216930 A1    Sep. 29, 2005

(30) Foreign Application Priority Data

Mar. 25, 2004    (JP)    .............................. 2004-088986

(51) Int. Cl.
*G11B 23/03*    (2006.01)
*G11B 23/02*    (2006.01)
(52) U.S. Cl. ...................... 720/729; 360/132; 360/133; 242/338.1; 242/348
(58) Field of Classification Search ................ 720/729, 720/725
See application file for complete search history.

(56) References Cited

U.S. PATENT DOCUMENTS

| | | | | |
|---|---|---|---|---|
| 4,694,448 A | * | 9/1987 | Tamaru et al. .............. | 720/734 |
| 5,568,455 A | * | 10/1996 | Balsom .................... | 369/30.45 |
| 5,581,540 A | * | 12/1996 | Dang ......................... | 720/729 |
| 5,917,803 A | * | 6/1999 | Goto et al. .................. | 720/735 |
| 6,349,087 B1 | * | 2/2002 | Okamoto et al. ........... | 720/720 |
| 6,480,464 B2 | * | 11/2002 | Okamoto et al. ........... | 720/729 |
| 6,507,560 B2 | * | 1/2003 | Okamoto et al. ........... | 720/740 |
| 6,574,189 B1 | * | 6/2003 | Ko et al. ..................... | 720/729 |
| 6,753,830 B2 | * | 6/2004 | Gelbman ..................... | 345/55 |
| 6,839,900 B2 | * | 1/2005 | Obata et al. ................ | 720/729 |
| 7,007,291 B2 | * | 2/2006 | Saji et al. .................... | 720/725 |
| 2002/0021639 A1 | * | 2/2002 | Obata et al. ................ | 369/52.1 |
| 2004/0205809 A1 | * | 10/2004 | Saji et al. .................... | 720/741 |
| 2005/0257233 A1 | * | 11/2005 | Okazawa et al. ........... | 720/725 |
| 2006/0112405 A1 | * | 5/2006 | Okazawa et al. ........... | 720/738 |
| 2007/0074239 A1 | * | 3/2007 | Okazawa et al. ........... | 720/740 |

FOREIGN PATENT DOCUMENTS

JP          2003-242740 A        8/2003

* cited by examiner

*Primary Examiner*—Angel Castro
*Assistant Examiner*—Christopher R. Magee
(74) *Attorney, Agent, or Firm*—Sughrue Mion, PLLC

(57) ABSTRACT

A disc cartridge including a disc medium which is loaded into a drive device and into/from which information can be recorded/reproduced; a case that houses the disc medium rotatably; a disc opening from which the disc medium provided into the case can be taken out; and a disc taking-out history detecting portion that can be deformed recognizably and irreversibly according to an operation for firstly taking out the disc medium from the case, is provided to judge whether a disc medium is taken out of the case.

14 Claims, 16 Drawing Sheets

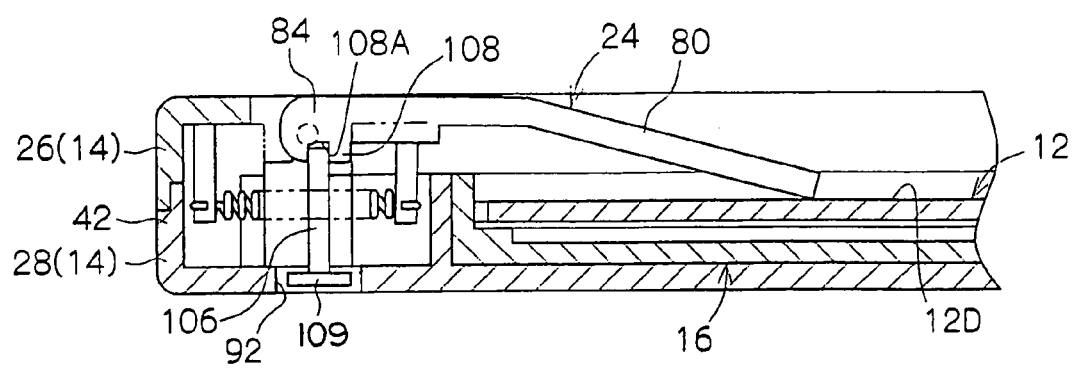
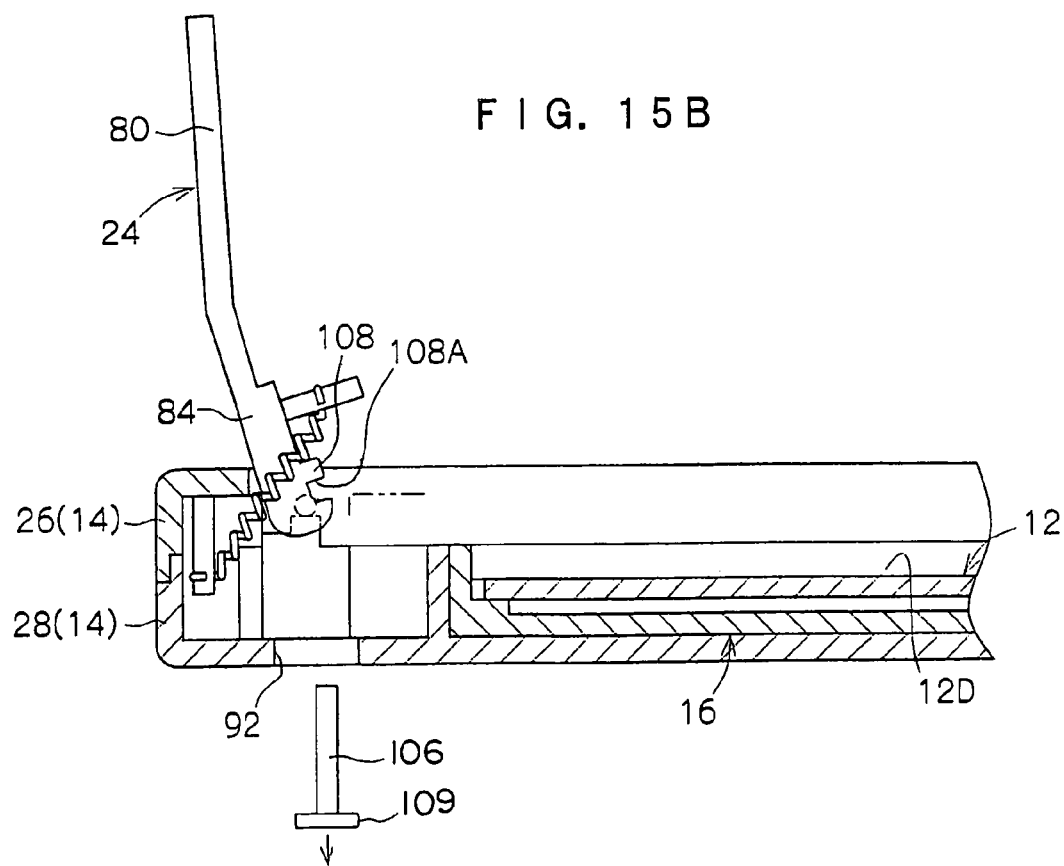
FIG. 15A
FIG. 15B

DISC CARTRIDGE HAVING DISC TAKING-OUT HISTORY DETECTING PORTION

CROSS-REFERENCE TO RELATED APPLICATION

This application claims priority under 35 USC 119 from Japanese Patent Application No. 2004-088986 the disclosures of which are incorporated by reference herein.

BACKGROUND OF THE INVENTION

1. Field of the Invention

The present invention relates to a disc cartridge which is loaded into a drive device and houses a disc medium into/from which information is recorded/reproduced.

2. Description of the Related Art

Recording and reproducing information are carried out on disc media such as an optical disc and a magneto-optical disc in the following manner. The disc medium is rotated with being loaded into drive device, and a laser beam or both a laser beam and a magnetic field is/are emitted to a recording layer by a recording head. As a result, information is recorded by formation of pits due to fragmentation and/or raised temperature of the recording layer, a phase change, reversed magnetization, and the like. Information which is recorded is reproduced by reading a difference in reflectance and a polarizing angle of the laser beams using a reproducing head.

For example, in Japanese Patent Application Laid-Open No. 2003-242740, a disc retaining member is axially supported to a case so as to be rotatable. When a disc medium is preserved, the disc retaining member presses to hold disc medium, and when the disc medium is operated, the disc retaining member is slightly separated from the disc medium.

When a disc medium is preserved/operated, the disc retaining member covers the disc medium, so that the disc medium cannot be taken out of the case. When, however, the disc retaining member is moved rotationally (rotated) through a constant angle, the disc medium can be taken out.

When the disc medium is, however, housed in the case, quality of recording/reproducing histories of the disc medium can be maintained. For this reason, when the disc medium is taken out of the case, the quality of the disc medium is possibly not maintained. For this reason, the assurance of the quality of the disc medium differs according to whether the disc medium is taken out.

SUMMARY OF THE INVENTION

In order to solve the above problem, the present invention provides a disc cartridge that can judge whether a disc medium is taken out of a case.

According to a first aspect of the invention, a disc cartridge includes: a disc medium which is loaded into a drive device and into/from which information can be recorded/reproduced; a case that houses the disc medium rotatably; a disc opening from which the disc medium provided into the case can be taken out; and a disc taking-out history detecting portion that can be deformed recognizably and irreversibly according to an operation for firstly taking out the disc medium from the case.

According to the first aspect of the invention, when the case which houses in the disc medium into/from which information is recorded and reproduced is loaded into a drive device, the disc medium can rotate. The disc medium for recording and reproducing includes read-only disc media (for example, DVD-ROM and the like), disc media on which writing is possible only once (for example, DVD-R, DVD+R and the like), and disc media on which recording is possible repeatedly (for example, DVD-RW, DVD-RAM and the like).

The case is provided with the disc opening from which a disc medium can be taken out, and the disc taking-out history detecting portion that can be deformed recognizably and irreversibly according to the operation for firstly taking out the disc medium from the case.

The provision of the disc taking-out history detecting portion enables the determination whether the disc medium is ever taken out of the case (taking-out history). When the disc taking-out history detecting portion is irreversibly deformed ("irreversibly deformed" means "broken", "destroyed", "fractured" or the like) according to the operation for firstly taking out the disc medium from the case, it cannot be returned to a state before the deformation. For this reason, it is not possible to cook taking-out history. That is, it is not possible to say that the disc medium is not taken out from the case when actually the disc medium is taken out from the case, because the disc taking-out history detecting portion is irreversibly deformed when actually the disc medium is taken out from the case.

For example, even though a case in which the disc taking-out history detecting portion is not deformed recognizably and irreversibly according to an operation of taking out the disc medium from the case, when the disc medium is taken out, a user deforms the disc taking-out history detecting portion so as to be capable of understanding the taking-out history. This, however, causes improper cases such that the user does not intentionally deform the disc taking-out history detecting portion or the user forgets to deform the disc taking-out history detecting portion. As a result, a problem such that the taking-out history of the disc medium becomes inaccurate arises. However, in the aspect, the disc taking-out history detecting portion is automatically deformed irreversibly according to the operation for firstly taking out the disc medium, thereby preventing the above problem.

According to a second aspect of the invention, in the disc cartridge of the first aspect, the disc taking-out history detecting portion is a part of the case, which is irreversibly removed according to the taking-out operation.

According to the second aspect of the invention, a part of the case is irreversibly removed according to the taking-out operation, so that the taking-out history becomes clear based on the presence/non-presence of the disc taking-out history detecting portion.

According to a third aspect of the invention, in the disc cartridge of the second aspect, the case has an upper shell at which the disc opening is formed, a lower shell to be jointed to the upper shell, and a retaining member which rotates between a close position at which the retaining member partially closes the disc opening to press the disc medium toward the lower shell and an open position at which the retaining member opens partially closed area of the disc opening and the disc medium can be taken out, and the disc taking-out history detecting portion has a sealing member provided at the lower shell, and a detecting hole closed by the sealing member, and when the retaining member rotates to the open position, the sealing member is irreversibly removed.

According to the third aspect of the invention, the upper shell at which the disc opening is formed and the lower shell are joined together so as to compose the case. The case is provided with the retaining member rotatively, and the retaining member is rotated between a close position at which the retaining member partially closes the disc opening to press the disc medium toward the lower shell and an open position at which the retaining member opens the disc opening and the disc medium can be taken out.

The disc taking-out history detecting portion has the sealing member provided to the lower shell, and the detecting hole closed by the sealing member. When the retaining member is moved rotationally (rotated) to the open position, the sealing member is irreversibly removed. That is to say, when the retaining member is rotated to the open position, the sealing member is irreversibly removed so that the detecting hole closed by the sealing member is opened. For this reason, the disc medium taking-out history can be simply recognized by observing a state whether the detecting hole is opened or closed.

According to a fourth aspect of the invention, in the disc cartridge of the third aspect, the sealing member has a first cover that is bridged to the inner peripheral edge of the detecting hole so as to close the detecting hole; and a first pillar portion that is provided upright on the first cover, and is pressed so as to irreversibly deform the first cover when the retaining member rotates to the open position.

According to the fourth aspect of the invention, the first cover which is bridged to the inner peripheral edge of the detecting hole closes the detecting hole, and the first pillar portion is installed upright onto the first cover so as to be pressed when the retaining member moves rotationally (rotates) to the open position. As a result, the first cover can be irreversibly deformed via the first pillar portion.

According to a fifth aspect of the invention, in the disc cartridge of the fourth aspect, a notched portion is provided to a connected portion between the first cover and the inner peripheral edge of the detecting hole.

According to the fifth aspect of the invention, when the notched portion is provided to the connected portion between the first cover and the inner peripheral edge of the detecting hole, the connected portion between the first cover and the inner peripheral edge of the detecting hole is easily broken (ruptured), and the first cover is separated from the inner peripheral edge of the detecting hole, so that the first cover can be securely removed from the case through the detecting hole.

According to a sixth aspect of the invention, in the disc cartridge of the fourth or the fifth aspect, a taking-out hole through which the broken first cover and the first pillar portion can be taken out is provided at a surface of the case different from a surface of the case at which the detecting hole is provided.

According to the sixth aspect of the invention, the taking-out hole through which the first cover and the first pillar portion can be taken out is provided. As a result, when the first cover and the first pillar portion are constituted separately from the disc retaining member, after the connected portion between the first cover and the inner peripheral edge of the detecting hole is broken, the first cover and the first pillar portion can be taken out form the case through the taking-out hole.

After the connected portion between the first cover and the inner peripheral edge of the detecting hole is broken, the first cover and the first pillar portion are taken out from the case, thereby preventing the first cover from again closing the detecting hole by mistake. The provision of the taking-out hole on the surface different form the surface of the detecting hole, for example, decreases a danger of a misoperation when the drive device judges the disc medium taking-out history.

According to a seventh aspect of the invention, in the disc cartridge of the third aspect, the sealing member has a second pillar portion that extends along an axial direction of the detecting hole and is formed integrally with the retaining member; and a second cover that is formed integrally with an end of the second pillar portion and is smaller than the detecting hole, and is separated from the second pillar portion so as to drop off from the detecting hole when the retaining member rotates to the open position.

According to the seventh aspect of the invention, the second pillar portion which extends along the axial direction of the detecting hole is formed integrally with the retaining member. The second cover which is formed smaller than the detecting hole is provided integrally with the end of the second pillar portion. That is to say, the second cover and the second pillar portion are formed integrally with the retaining member. In other words, since the second cover is not provided integrally with the lower shell, the second cover and the inner peripheral edge of the detecting hole are not bridged, so that the second cover is simply arranged in the detecting hole by the second pillar portion.

For this reason, when the retaining member is rotated to the open position, the second cover is separated from the second pillar portion. As a result, the second cover drops off from the detecting hole, so that the detecting hole can be opened.

According to an eighth aspect of the invention, in the disc cartridge of the third aspect, the sealing member has a third pillar portion that extends along an axial direction of the detecting hole and is press-fitted into the retaining member to be held at the retaining member; and a third cover that is formed integrally with an end of the third pillar portion and is smaller than the detecting hole, when the retaining member rotates to the open position, the third pillar portion being separated from the retaining member so that the third cover as well as the third pillar portion drop off from the detecting hole.

According to the eighth aspect of the invention, the third pillar portion which extends along the axial direction of the detecting hole is press-fitted into the retaining member thereby third pillar portion being held, and when the retaining member is rotated to the open position, the third pillar portion is separated from the retaining member. On the other hand, the third cover which is formed smaller than the detecting hole is provided integrally with the end of the third pillar portion. When the third pillar portion is separated from the retaining member, the third cover as well as the third pillar portion drop off from the detecting hole so that the detecting hole can be opened.

According to a ninth aspect of the invention, in the disc cartridge of any one of the third to the eighth aspects, the disc cartridge further includes a head opening that is provided at the lower shell and allows a recording/reproducing head of a drive device to access to the disc medium; a shutter mechanism that opens and closes the head opening when a first shutter provided in the case coaxially with the disc medium and a second shutter that can rotate around an axis different from that of the first shutter, rotate to opposite directions in a cooperative manner.

According to the ninth aspect of the invention, the head opening which allows the recording/reproducing head of the drive device to access to the disc medium is formed on the lower shell. The shutter mechanism having a first shutter provided in the case coaxially with the disc medium and a second shutter that can rotate around an axis different from that of the first shutter, is provided within the case. The first shutter and the second shutter rotate to opposite directions in a cooperative manner so as to open and close the head opening.

As a result, while the disc cartridge is loaded into the drive device, the recording/reproducing head of the drive device can access to the disc medium in the cartridge. On the other hand, the preservation of the disc medium in the sealed space blocked form the outside can be maintained when the disc cartridge is outside the drive device. For this reason, a fear that dust from the outside adheres to the recording surface (lower surface) of the disc medium and the recording/reproducing of information is inhibited is reduced.

According to a tenth aspect of the invention, in the disc cartridge of the fourth aspect, an outer peripheral edge of the first cover and the inner peripheral edge of the detecting hole are bridged by at least one bridging member.

According to an eleventh aspect of the invention, in the disc cartridge of the seventh aspect, a notched portion is formed at a connection portion between the second pillar portion and the second cover.

According to a twelfth aspect of the invention, in the disc cartridge of the eighth aspect, a recess portion is formed at the retaining member, the end of the third pillar portion being press-fitted into the recess portion.

In the first aspect of the invention, the provision of the disc taking-out history detecting portion enables the determination whether the disc medium is ever taken out of the case (taking-out history). When the disc taking-out history detecting portion is irreversibly deformed ("irreversibly deformed" means "broken", "destroyed", "fractured" or the like) according to the operation for firstly taking out the disc medium from the case, it cannot be returned to a state before the deformation. For this reason, it is not possible to cook taking-out history. That is, it is not possible to say that the disc medium is not taken out from the case when actually the disc medium is taken out from the case, because the disc taking-out history detecting portion is irreversibly deformed when actually the disc medium is taken out from the case.

In the second aspect of the invention, a part of the case is irreversibly removed according to the taking-out operation, so that the taking-out history becomes clear based on the presence/non-presence of the disc taking-out history detecting portion.

In the third aspect of the invention, the disc medium taking-out history can be easily recognized on the basis of the state whether the detecting hole is closed or opened.

In the fourth aspect of the invention, the first cover can be irreversibly deformed via the first pillar portion.

In the fifth aspect of the invention, by making the connected portion between the first cover and the inner peripheral edge of the detecting hole easily broken (ruptured), the first cover is separated from the inner peripheral edge of the detecting hole, so that the first cover can be removed from the case securely via the detecting hole.

In the sixth aspect of the invention, after the connected portion between the first cover and the inner peripheral edge of the detecting hole is broken, the first cover and the first pillar portion are taken out of the case. As a result, the first cover is prevented from again closing the detecting hole by mistake. When the taking-out hole is provided to the surface different from the surface of the detecting hole, for example, the danger of the misoperation is decreased when the drive device discriminates the taking-out history of the disc medium.

In the seventh aspect of the invention, when the retaining member is rotated to the open position, the second cover is separated from the second pillar portion. As a result, the second cover drops off from the detecting hole so that the detecting hole can be opened.

In the eighth aspect of the invention, when the third pillar portion is separated from the retaining member, the third cover as well as the third pillar portion drop off from the detecting hole, so that the detecting hole can be opened.

In the ninth aspect of the invention, while the disc cartridge is loaded into the drive device, the recording/reproducing head of the drive device can access to the disc medium in the cartridge. On the other hand, the preservation of the disc medium in the sealed space blocked from the outside can be maintained when the disc cartridge is outside the drive device. For this reason, the fear that dust from the outside adheres to the recording surface (lower surface) of the disc medium and the recording/reproducing of the information is inhibited is reduced.

BRIEF DESCRIPTION OF THE DRAWINGS

Embodiments of the invention will be described in detail with reference to the following figures, wherein:

FIGS. 15A and 15B are operation explanatory diagrams illustrating a modified example of the disc retainer of the disc cartridge according to the embodiment of the invention.

DETAILED DESCRIPTION OF THE INVENTION

Hereinafter, one embodiment of the present invention is explained in detail below with reference to the drawings. An arrow A shown in FIG. 2 indicates a direction where a disc drive device (hereinafter, simply "drive device") is loaded with a disc cartridge 10, and for convenience of the explanation, the arrow A indicates a front side. A direction indicated by an arrow B perpendicular to the arrow A is an upper side, and a direction indicated by an arrow C perpendicular to the arrows A and B is a right side. "At the time of preservation" in the invention is occasionally explained as "at the time of non-use", and "at the time of operation" as "at the time of use".

Figure 1:
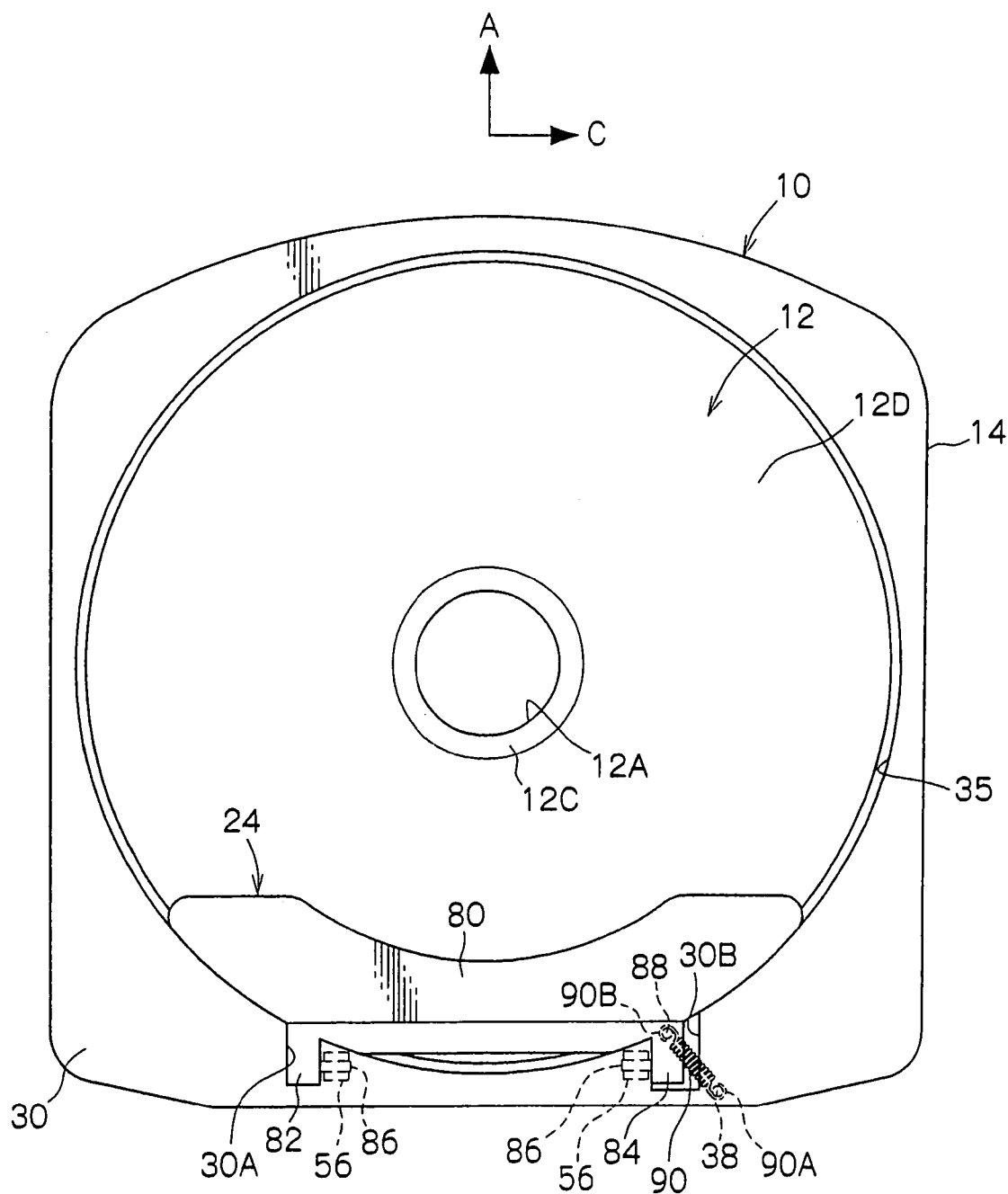
FIG. 1 is a schematic plan view illustrating an appearance of a disc cartridge according to an embodiment of the present invention.
Figure 2:
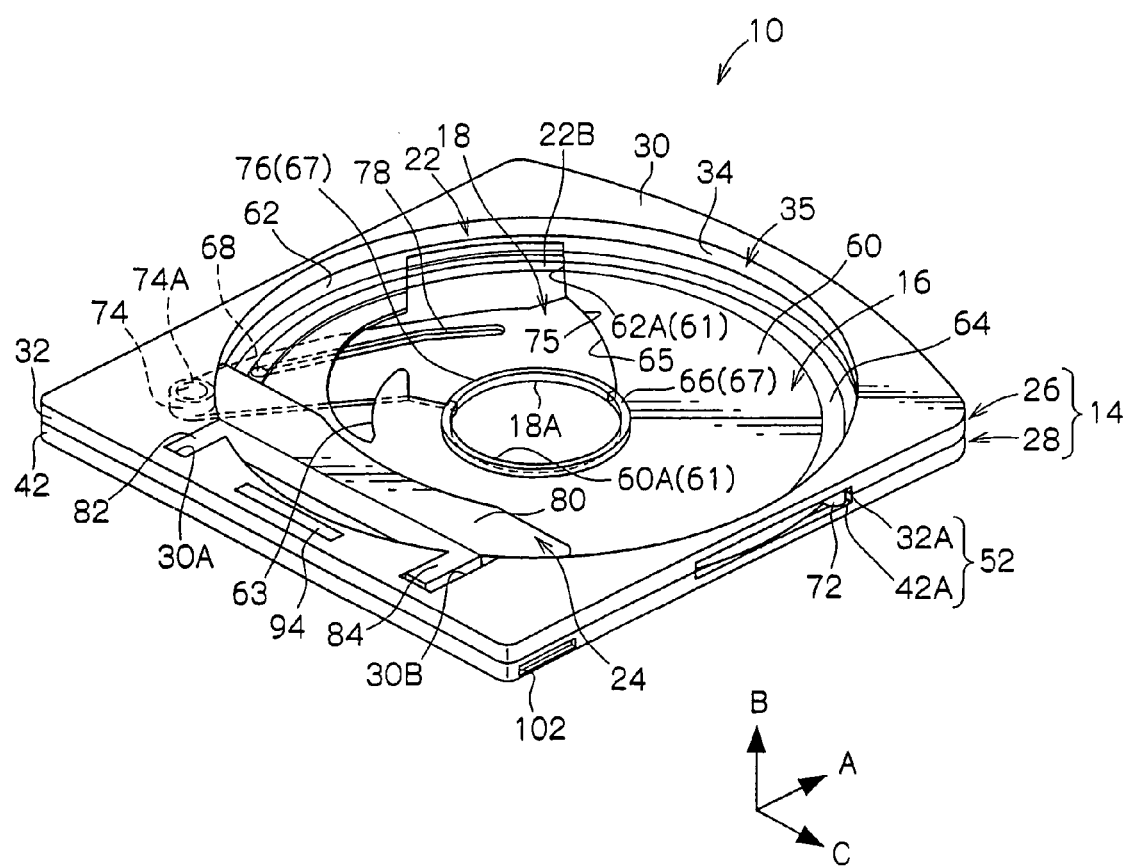
FIG. 2 is a perspective view illustrating a state of the disc cartridge from which a disc medium is removed according to the embodiment of the invention.
Figure 3:
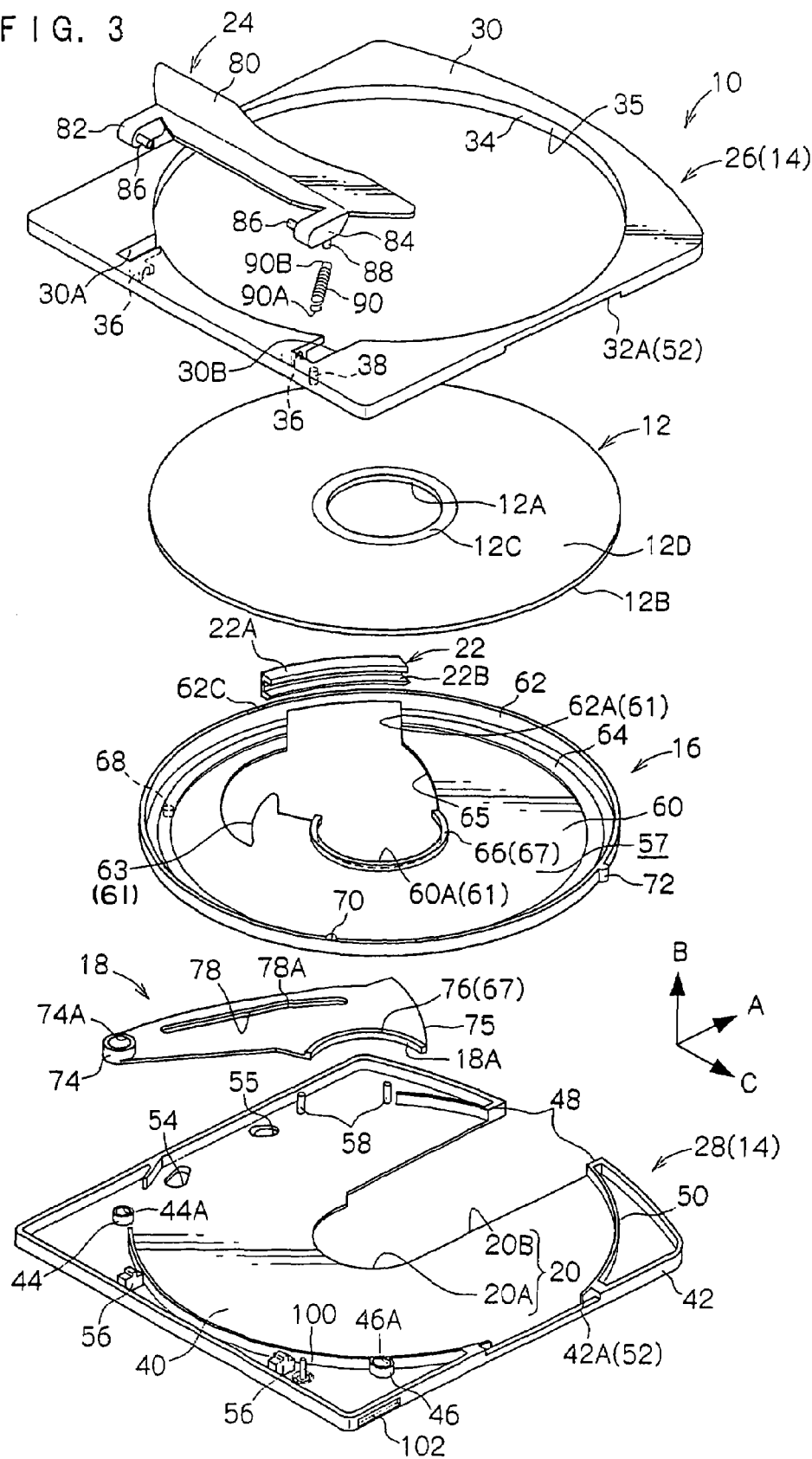
FIG. 3 is an assembled perspective view illustrating a constitution of the disc cartridge according to the embodiment of the invention.

As shown in FIGS. 1 to 3, the disc cartridge 10 mainly includes a disc medium 12, a case 14, an inner rotor 16, a second shutter member 18, a disc receiver 22, and a disc retainer 24. The disc medium 12 is an information recording/reproducing medium formed into a disc shape. The case 14 houses the disc medium 12. The inner rotor 16 and the second shutter member 18 can open and close an opening 20 provided on a lower surface of the case 14 in order to access to the disc medium 12. The disc receiver 22 moves up and down in conjunction with (working with) rotational movement of the inner rotor 16. The disc retainer 24 holds the disc medium 12 so that the disc medium 12 does not drop out from a disc opening 35 provided to the upper surface of the case 14 when the disc medium 12 is preserved.

A lock member is provided so as to inhibit the rotational movement of the inner rotor 16 so as to maintain a closed state of the opening 20 when the disc cartridge 10 is not used (the disc medium 12 is preserved), but it is not shown and its explanation is omitted.

The disc medium 12 is explained.

Figure 4:
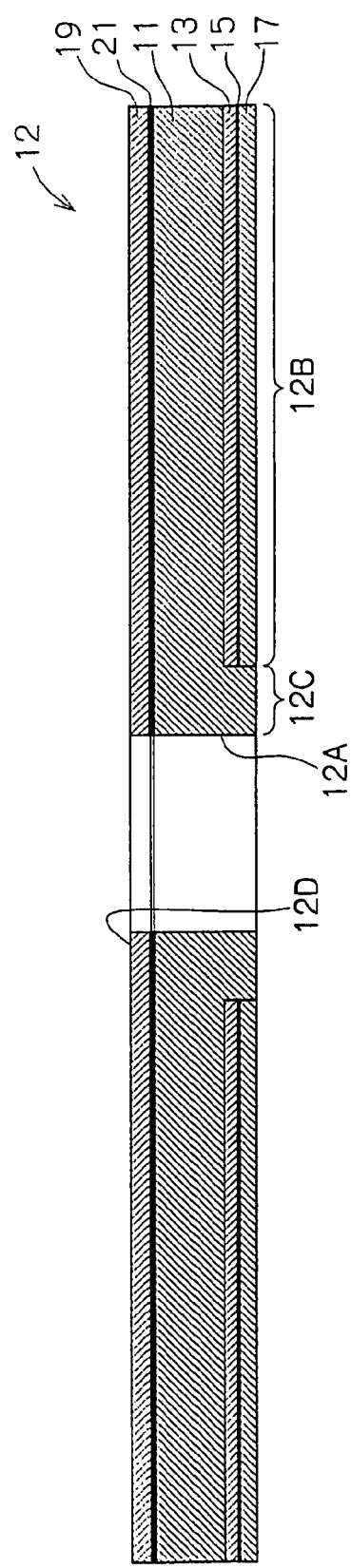
FIG. 4 is a sectional view illustrating the constitution of the disc medium.

As shown in FIG. 4, the disc medium 12 is composed of a substrate 11, a reflection layer 13 for improving reflectance at the time of reproducing information, a recording layer 15 on which information is recorded, and a light transmitting layer 17 for transmitting a laser beam. A printing layer 19 is provided onto the surface of the substrate 11.

Contents or the like of the disc medium 12, for example, are printed to the printing layer 19, so that a user can easily understand the contents of the disc medium 12. Further, a design property of the printing layer 19 is heightened, so that a design property of the entire disc cartridge 10 can be improved.

A moisture-proof layer (aluminum sputtering or the like) 21 is provided between the printing layer 19 and the substrate 11. Since the substrate 11 is always exposed to an outside through the disc opening 35 as mentioned later, the provision of the moisture-proof layer 21 between the printing layer 19 and the substrate 11 can prevent moisture absorption of the substrate 11.

A circular center hole 12A is drilled in an axial center of the disc medium 12, and an area between the center hole 12A, and a recording surface 12B (area of the light transmitting layer 17 opposed to the recording layer 15) is a chucking area 12C where a rotational spindle shaft of the drive device holds the disc medium 12. In the embodiment, a diameter (outer diameter) of the disc medium 12 is about 120 mm.

The case 14 is explained below.

As shown in FIGS. 2 and 3, the case 14 is constituted into an approximately rectangular planiform container shape in which an upper shell 26 and a lower shell 28 made of synthetic resin are jointed. Concretely, the case 14 is formed such that a front edge is an arc shape which is symmetrical (right-left) from planar view and both rear end corners are notched crosswise. This shape prevents misleading into the drive device.

The upper shell 26 has a top panel 30 whose shape copes with the shape of the case 14 from planar view, and an external wall 32 which is installed upright downward along an outer peripheral edge of the top panel 30. A notched portion 32A with an approximately rectangular shape is formed on a right wall of the external wall 32.

On the other hand, a disc opening 35 which is a circular hole with a slightly larger diameter than the outer diameter of the disc medium 12 (such a size that it does not contact with the disc medium 12 even if the disc medium 12 rotates) is drilled in the top panel 30. Due to that the disc opening 35 is provided to the top panel 30 of the upper shell 26, a portion which swells out upward is not formed, thereby making the case 14 thinner than a case of a sealed disc cartridge without the disc opening 35.

An inner wall 34 with a predetermined height is installed downward to an inner peripheral edge of the disc opening 35, and the disc medium 12 is housed in the inner wall 34 so as to be capable of rotating. The disc opening 35 enables the disc medium 12 to be inserted into the case 14 and be taken out of the case 14.

Notched portions 30A and 30B which allow arms 82 and 84 of the disc retainer 24 are formed on a rear portion of the top panel 30. A lock pin 38, which locks a hook 90A with an approximately circular shape formed on one end of a coil spring 90 as a urging member, mentioned later, is projected from an inner surface of the top panel 30 which is on a rear side and an outer side of the one (right) notched portion 30B.

The notched portion 30B is notched so that its side of the lock pin 38 is broader than the notched portion 30A, and when the disc retainer 24, mentioned later, moves rotationally (rotates) to a taking-out position of the disc medium 12 (to the opened position), it allows the movement of the coil spring 90.

Figure 5:
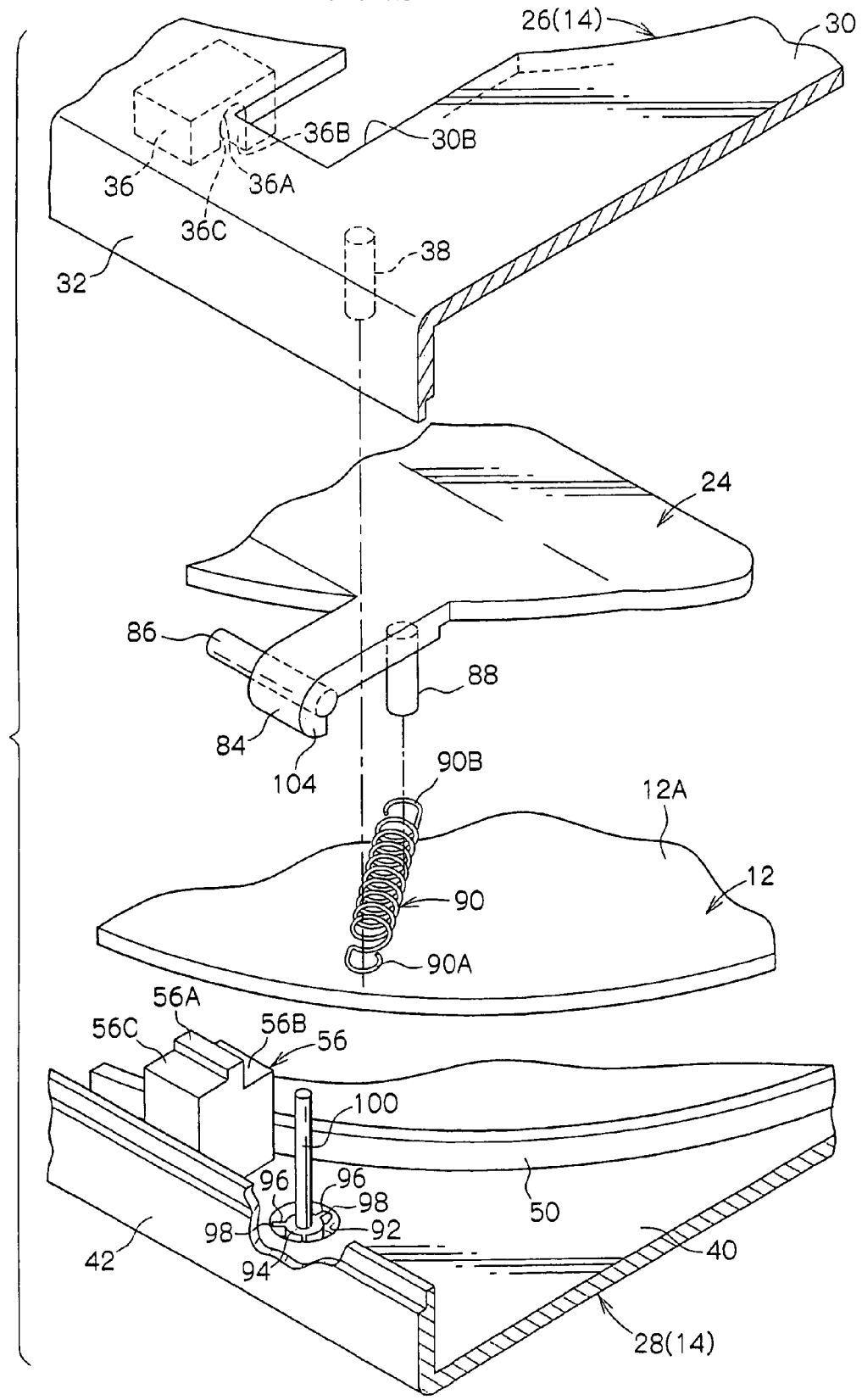
FIG. 5 is an assembled perspective view illustrating a constitution of a disc retainer of the disc cartridge according to the embodiment of the invention.

As shown in FIGS. 3 and 5, shaft retainers 36 are protruded from ar rear inner surface of the top panel 30 between the notched portions 30A and 30B with a predetermined gap. The shaft retainers 36 retain shafts 86 provided to the arms 82 and 84 so that the shafts 86 do not drop off but move rotationally (rotate). The shaft retainers 36 are pared with shaft receivers 56 which are protruded from the lower shell 28 (mentioned later).

On the other hand, the lower shell 28 has a bottom panel 40 with a shape approximately corresponding to the top panel 30, and an external wall 42 with a shape corresponding to the external wall 32 of the upper shell 26. The bottom panel 40 is provided with an opening 20. The opening 20 is composed of a hub hole 20A and a recording/reproducing head window 20B, so that it is entirely formed into an approximately U shape which is opened forward. A diameter of the hub hole 20A is larger than the outer diameter of the center hole 12A of the disc medium 12 and slightly smaller than the outer diameter of the chucking area 12C (inner diameter of the recording surface 12B). The recording/reproducing head window 20B has an approximately rectangular shape connected to a front side of the hub hole 20A from a center line along a right-left direction of the hub hole 20A. The shapes of the hub hole 20A and the recording/reproducing head window 20B are not limited to them, and they may be provided independently.

The hub hole 20A is arranged so as to be approximately coaxial with the housed disc medium 12 with the upper shell 26 being jointed to the lower shell 28. The hub hole 20A has the above dimension, so that only the center hole 12A and the chucking area 12C are exposed to the outside but the recording surface 12B is not exposed to the outside at the time of non-use. The recording/reproducing head window 20B for exposing the recording surface 12B is widened so that its left edge is positioned on a left side from a tangent line along a front-rear direction of the hub hole 20A and its front portion is opened forward with a corresponding portion of the external wall 42 being notched.

The rotational spindle shaft of the drive device can enter the hub hole 20A, and while the shaft is being engaged with the center hole 12A of the disc medium 12 via the hub hole 20A, the shaft rotates the disc medium 12. The recording/reproducing head of the drive device enters the recording/reproducing head window 20B, and information is recorded or reproduced into/from the recording layer 15 of the disc medium 12 (see FIG. 4). At this time, since the recording/reproducing head window 20B is opened also forward, the recording/reproducing head can easily access to the external peripheral edge of the recording surface 12B.

On the other hand, a pair of bosses 44 and 46 are protruded from the rear inner surface of the bottom panel 40 with a predetermined gap. The left boss 44 is formed into a circular shape from planar view, and the right boss 46 is formed into an oval shape from planar view whose right-left direction is long. Locating holes 44A and 46A are drilled in the bosses 44 and 46, respectively, and the locating pins (not shown) of the drive device are inserted into the locating holes 44A and 46A. As a result, the disc cartridge 10 is located in the drive device.

A rib-shaped inner wall 50 which houses and rotatively holds the inner rotor 16, mentioned later, is installed upright on the bottom panel 40. The inner wall 50 is formed into a discontinuous arc shape from planar view whose diameter is slightly larger than that of the inner roller 16. Dust-proof ribs 48, whose front end is connected to the external wall 42 and rear end is connected to the inner wall 50, are installed upright on front ends on both right and left edges of the recording/reproducing head window 20B, respectively. Heights of the dust-proof ribs 48 and the inner wall 50 are equivalent to the height of the circular wall 62 of the inner rotor 16.

An approximately rectangular notched portion 42A is formed on the right external wall 42 correspondingly to the notched portion 32A formed on the external wall 32 of the upper shell 26. A shutter operation window 52 is formed so as to protrude an operation protrusion 72 of the inner rotor 16 when the case 14 is formed by joining the upper shell 26 and the lower shell 28 with screws or ultrasonic adhesion in a state that the end surfaces of the external walls 32 and 42 abut against each other.

An installation position of the shutter operation window 52 is not limited to the right wall of the case 14, and the position is changed suitably according to a relationship with the drive device, the shapes of the inner rotor 16 and the second shutter member 18, and the like.

Shaft receiving portions 56 are projected from a rear inner surface of the bottom panel 40 with a predetermined gap so as to be pared with the shaft retainers 36 protruded form the upper shell 26. The shaft receiving portions 56 support the shafts 86 of the disc retainer 24, mentioned later, rotatively. The shaft receiving portions 56 have a protruded rim 56A with predetermined height which is parallel with the shaft 86, and step portions 56B and 56C formed on front and rear sides of the protruded rim 56A. For example, the front step portion 56B is lower, and the rear step portion 56C is higher.

On the other hand, the shaft retainers 36 formed on the upper shell 26 have a bottom portion 36A formed into a semi-arc shape from side view, and a front wall 36B and a rear wall 36C formed linearly so as to be continuous with the bottom portion 36A. The heights of the front wall 36B and the rear wall 36C differ from each other, for example, the front wall 36B is higher than the rear wall 36C.

The shaft receiving portions 56 can be inserted between the front walls 36B and the rear walls 36C of the shaft retainers 36, respectively. The shaft retainers 36 are made to be opposed to the shaft receiving portions 56, the end surfaces of the front walls 36B touch the step portions 56B, and the end surfaces of the rear walls 36C touch the step portions 56C (the upper shell 26 is overlaid on the lower shell 26 so that the case 14 is assembled). At this time, a space in which the shafts 86 of the disc retainer 24 can be held rotatively is formed between the bottom portions 36A and the protruded rims 56A.

Figure 6:
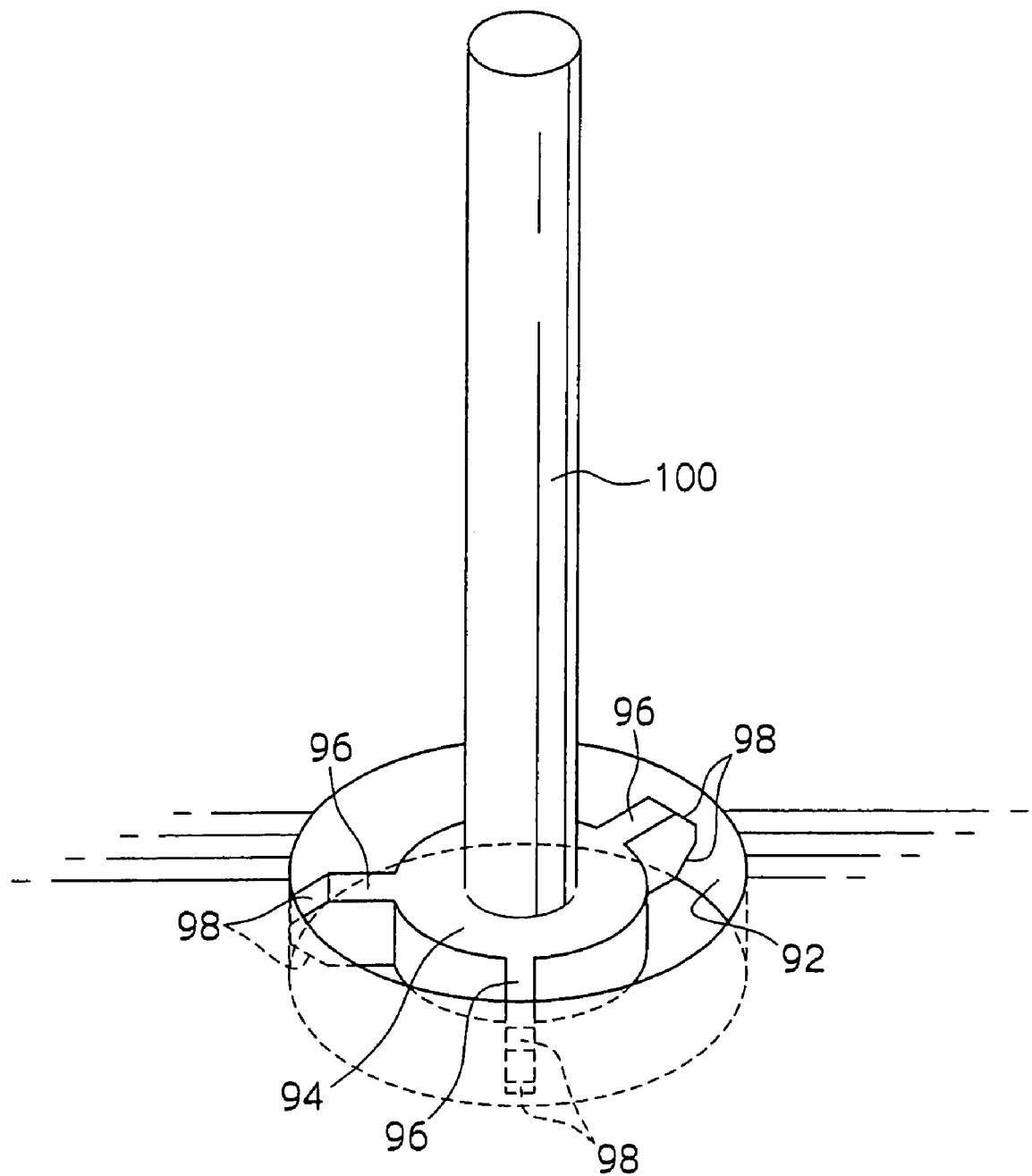
FIG. 6 is an enlarged perspective view illustrating a main section of the disc cartridge according to the embodiment of the invention.

A circular detecting hole 92 pierces an outer vicinity of one shaft receiving portion 56 (right). As shown in FIG. 6, a cylindrical cover 94 whose outer diameter is smaller than an inner diameter of the detecting hole 92 is arranged in the detecting hole 92. An inner peripheral edge of the detecting hole 92 and an outer peripheral edge of the cover 94 are bridged by plural (here, three) plate-shaped thin portions 96 (connecting portions).

A notched portion 98 is formed on each of end portions (inner peripheral edge of the detecting hole 94) of the thin portions 96, so that the thin portions 96 are easily broken. A cylindrical pillar portion 1 10 is installed upright on a center of the cover 94 so as to be approximately flush with the protruded rims 56A of the shaft receiving portions 56.

As shown in FIGS. 2 and 3, a rectangular taking-out hole 102 pierces a portion of the external wall 42 which is perpendicular to a portion of the external wall 42 in the vicinity of one shaft receiving portion 56 and faces the side wall of the shaft receiving portion 56, and has a size such that the cover 94 and the pillar portion 100 can be inserted thereinto (mentioned later).

On the other hand, concave portions 54 and 55, which are engaged with engagement protrusions 68 protruded form the lower surface of the inner rotor 16, respectively, are formed on the inner surface of the bottom panel 40 with a predetermined gap. The concave portions 54 and 55 are formed so that their facing sides become gently inclined planes. A pair of guide pins 58, which support the disc receiver 22, mentioned later, to the bottom panel 40 so as to be capable of moving up and down, are protruded from the inner surface of the bottom panel 40 on the front side from the concave portions 54 and 55.

The inner rotor 16 and the second shutter member 18 are explained below.

As shown in FIG. 3, the inner rotor 16 and the second shutter 18 are provided on the bottom panel 40 of the lower shell 28. The inner rotor 16 is provided coaxially with the disc medium 12, and the second shutter member 18 is provided so as to move rotationally (rotate) around an axis different from that of the inner rotor 16.

The inner rotor 16 and the second shutter member 18 move rotationally (rotate) to the opposite directions, so that the recording/reproducing head window 20B is opened and closed. When the recording/reproducing head window 20B is opened, a part of the recording surface 12B of the disc medium 12 is exposed to the outside, so that an access by the recording/reproducing head of the drive device is enabled.

The inner rotor 16 as well as the inner wall 34 of the disc opening 35 in the upper shell 26 composes a housing portion 57 which can house the disc medium 12. The inner rotor 16 is composed of a first shutter 60 which faces the recording surface 12B of the disc medium 12 with a predetermined gap, and a circular wall 62 which can house the disc medium 12.

When the case 14 is assembled, the circular wall 62 is positioned on the inside of the inner wall 50 of the lower shell 28 so as to be capable of moving rotationally to the outside of the inner wall 34 of the upper shell 26. The upper end of the circular wall 62 is covered by the upper shell 26 (top panel 30).

An external peripheral receiving portion 64 which rises upward is protruded from the inner surface of the first shutter 60 along the circular wall 62 so as to support the outer peripheral edge of the disc medium 12 from beneath. Further, an opening 61 is formed on the first shutter 60.

The opening 61 is formed so that a notched portion 60A of an arc-shape from planar view corresponding to the hub hole 20A of the lower shell 28 and a notched portion 62A are bridged. The notched portion 62A is formed by notching a predetermined position of the circular wall 62, namely, a portion including the external receiving portion 64 corresponding to the recording/reproducing head window 20B at the time when the opening 20 is opened (see FIG. 14) into an approximately rectangular shape. An inner peripheral receiving portion 66 whose shape is an arc from planar view and which supports the external peripheral edge of the chucking area 12C of the disc medium 12 from beneath is protruded from the inner peripheral edge of the notched portion 60A.

Figure 14:
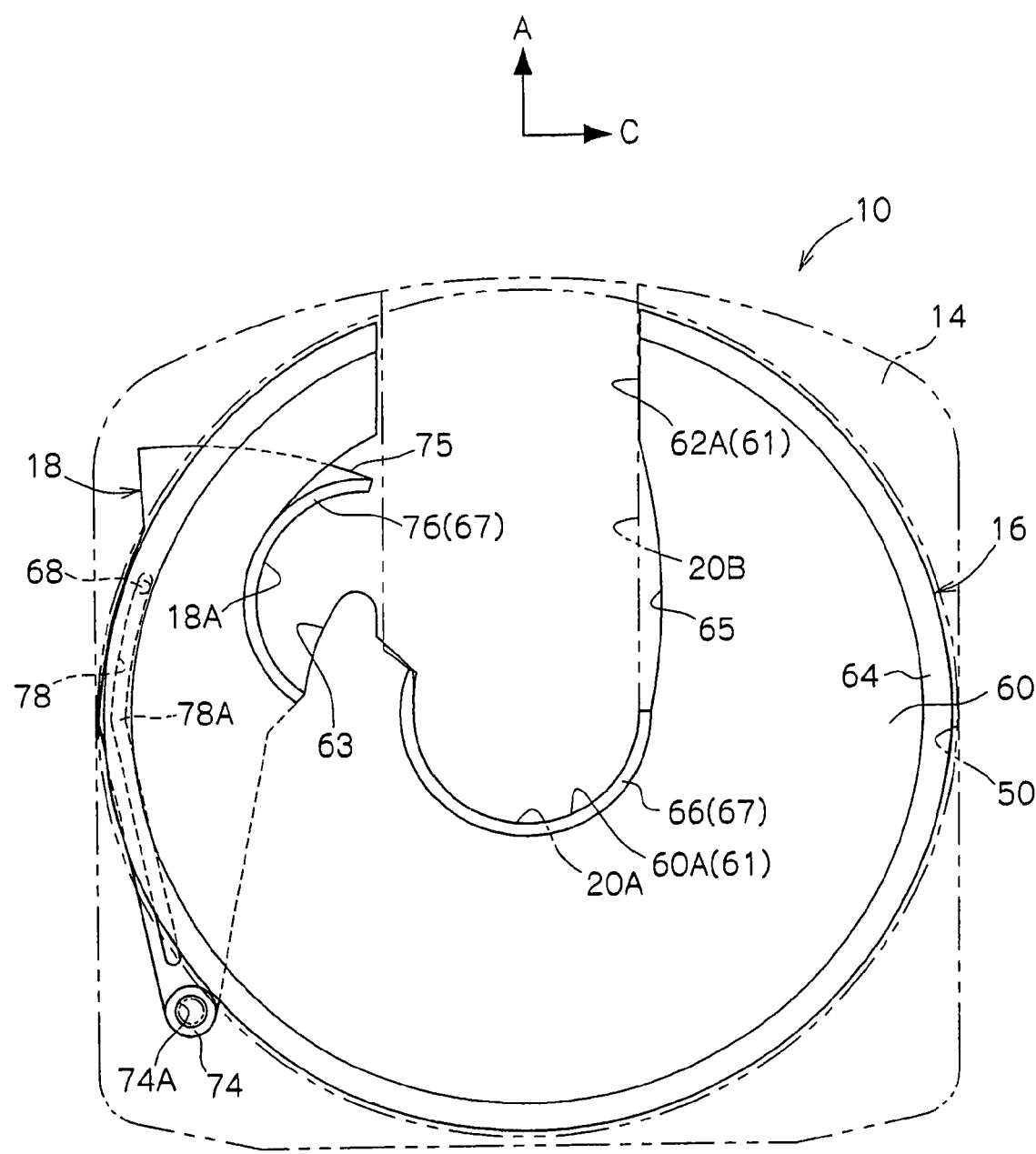
FIG. 14 is an operation explanatory diagram of the first shutter member and the second shutter member composing the disc cartridge according to the embodiment of the invention.

A portion between the notched portions 60A and 62A which is on the right side of the opening 61 has an arc shape from planar view which expands to the outer side from the right end of the recording/ reproducing head window 20B when the recording/reproducing head window 20B is opened (see FIG. 14). A abutting portion 65, which abuts against the second shutter member 18 with the recording/ reproducing window 20B is closed (see FIG. 9), is provided thereon.

Further, a notched portion 63 which is connected to the notched portion 60A is formed on the left side of the opening 61. An engagement protrusion 68 which moves the second shutter member 18 in conjunction with the inner roller 16 is protruded from a predetermined position of the lower surface of the external peripheral receiving portion 64 on the side of the notched portion 63.

On the other hand, a convex portion 70 for lifting the disc retainer 24 to a predetermined height is protruded from a predetermined position of the upper surface of the circular wall 62. The operation protrusion 72 which is protruded from the shutter operation window 52 is protruded on a predetermined position of the external peripheral surface of the circular wall 62 towards a radial direction. A cam step portion 62C which is engaged with the disc receiver 22, mentioned later, is formed on the upper surface of the circular wall 62 in a predetermined position on the left side from the notched portion 62A.

The second shutter member 18 has a boss 74 having a hole 74A which is fitted into the external periphery of the boss 44 protruded on the left side of the lower shell 28. As a result, the second shutter member 18 can move rotationally (rotate) about the boss 44. That is to say, the boss 44 is a rotational supporting point of the second shutter member 18. An end surface of the second shutter member 18 opposite to the boss 74 is a abutting portion 75 having an arc shape from planar view which contacts with the abutting portion 65 of the inner rotor 16.

Further, a notched portion 18A having an arc shape from planar view corresponding to the hub hole 20A is formed on the second shutter 18. An inner peripheral receiving portion 76 having an arc shape from planar view is protruded from the inner peripheral edge of the notched portion 18A. When the recording/reproducing head window 20B is closed, the inner peripheral receiving portion 76 touches the side surface of the inner peripheral receiving portion 66 of the inner rotor 16 so as to compose a circular convex portion 67 with a predetermined height (see FIG. 9).

The inner peripheral receiving portions 66 and 76 structuring the circular convex portion 67 support the inner peripheral edge of the disc medium 12 from beneath. That is to say, when the recording/reproducing head window 20B is closed, the inner peripheral receiving portions 66 and 76 touch the external peripheral edge of the chucking area 12C of the disc medium 12, and the external peripheral receiving portion 64 touches the external peripheral edge of the disc medium 12. As a result, when the recording/reproducing head window 20B is closed, dust, moisture, or the like can be prevented from entering the recording surface 12B through the hub hole 20A.

An elongated guide hole 78 having a substantially dogleg (V) shape from planar view is protruded from a predetermined position of the second shutter member 18. When the engagement protrusion 68 of the inner rotor 16 is inserted and engaged with the guide hole 78, the second shutter member 18 is cooperative with the inner rotor 16 so that they are capable of moving rotationally to opposite directions.

Since the upper surface of the inner peripheral receiving portion 76 projects further than the inner surface of the first shutter 60 of the inner rotor 16, the notched portion 63 is formed on the first shutter 60 of the inner rotor 16 along a moving trajectory of the inner peripheral receiving portion 76. As a result, the movement of the second shutter member 18 is allowed. The engagement protrusion 68 goes through the guide hole 78 so as to be inserted into the concave portions 54 and 55. That is to say, the projected height of the engagement protrusion 68 is higher than the thickness of the second shutter member 18.

The disc receiver 22 is explained below.

As shown in FIG. 3, the disc receiver 22 is used for covering the notched portion 62A formed on the external peripheral receiving portion 64, and when the recording/ reproducing head window 20B is closed, the disc receiver 22 is bridged so as to close the notched portion 62A. Concretely, the disc receiver 22 is formed into a U shape from sectional view so as to be capable of housing the circular wall 62 and have an arc shape from planar view whose curvature is the same as that of the circular wall 62.

A pair of engagement grooves (not shown) which are engaged with the guide pins 58 protruded from the lower shell 28 are formed on both the ends of the disc receiver 22, and the disc receiver 22 can move up and down along the guide pins 58.

As shown in FIGS. 7A to 7D, a cam protrusion 22C which is engaged with the cam step portion 62C is formed on a left end on the lower surface of an upper wall 22A so that the disc receiver 22 moves up and down according to the rotational movement of the inner rotor 16.

When, therefore, the recording/reproducing head window 20B is closed (see FIG. 7A), the cam protrusion 22C is supported to the upper surface of the circular wall 62 so that the disc receiver 22 in a rising position closes the notched portion 62A. A lower wall 22B of the disc receiver 22 covers a deficient portion of the external peripheral receiving portion 64 so that the disc receiver 22 as well as the external peripheral receiving portion 64 support the external peripheral edge of the disc medium 12.

On the other hand, when the recording/reproducing head window 20B is opened (see FIG. 7D), the cam protrusion 22C is engaged with the cam step portion 62C. The disc receiver 22 descends so as to avoid collision against the inner rotor 16 and allow the movement (rotational movement) of the inner rotor 16.

An upward taper surface is formed on the left end of the lower wall 22B of the disc receiver 22, and a downward taper surface is formed on an end which faces the left edge of the notched portion 62A of the external peripheral receiving portion 64. According to the rotational movement of the inner rotor 16, therefore, the external peripheral receiving portion 64 is easily set on the lower wall 22B. Further, a downward taper surface is formed on the right end of the lower wall 22B so as to touch the upward taper surface formed on the external peripheral receiving portion 64.

The disc retainer 24 is explained below.

As shown in FIGS. 3 and 8A to 8C, the disc retainer 24 has a pair of arms 82 and 84, and a retaining portion 80 having an approximately crescent shape from planar view. The arms 82 and 84 are provided with a predetermined gap on the rear side of the case 14 opposed to the front side provided with the opening 20, and are supported to the case 14 rotatively. The retaining portion 80 is connected to the ends of the arms 82 and 84 symmetrically, and accord with the shape of the disc medium 12 so as to cover a part of a non-recording surface 12D of the disc medium 12.

The retaining portion 80 has the approximately crescent shape from planar view in the symmetrical manner so as to avoid the chucking area 12 of the disc medium 12. The retaining portion 80 enters the disc opening 35 so as not to interfere a chucking member (not shown) of the drive device that holds the chucking area 12C from above.

The end of retaining portion 80 retains the non-recording surface 12D of the disc medium 12 (closed position), but its right and left ends may be slightly bent towards the disc medium 12 so as to retain only the external peripheral edge of the disc medium 12. In any ways, the disc retainer 24 retains the disc medium 12 so that the disc medium 12 does not drop off from the disc opening 35 and does not jounce in the housing portion 57 at the time of preservation (see FIG. 8A).

On the other hand, the pillar-shaped shafts 86 are protruded from the rear ends of the arms 82 and 84, respectively, to inward right and left directions. The shafts 86 are inserted into the spaces formed between the shaft receiving portions 56 of the lower shell 28 and shaft retainers 36 of the upper shell 26 rotatively.

A lock pin 88 which locks an approximately circular hook 90B formed on the other end of the coil spring 90 is protruded from the inner surface (lower surface) of the (right) arm 84. In a state that one end of the coil spring 90 (hook 90A) is locked onto the lock pin 38 protruded from the inner surface of the top panel 30 and the other end (hook 90B) of the coil spring 90 is locked onto the lock pin 88, the disc retainer 24 urges the disc medium 12 by the coil spring 90.

The convex portion 70 protruded from the upper surface of the circular wall 62 of the inner rotor 16 touches the inner surface of the (left) arm 82 so that a working face that pushes up the disc retainer 24 is formed. When the disc medium 12 operates (rotates), the working face of the arm 82 touches the convex portion 70, and the disc retainer 24 is maintained in a slightly rising position against the urging force of the coil spring 90 so that the rotation of the disc medium 12 is allowed.

When the disc medium 12 is taken out from the disc opening 35, the disc retainer 24 is moved rotationally (rotated) to the rear side by a hand of an operator. At this time, however, the urging (urging) force and the installation position of the coil spring 90 are determined so that the disc retainer 24 is temporarily maintained in its maximum rotational position.

Figure 8A:
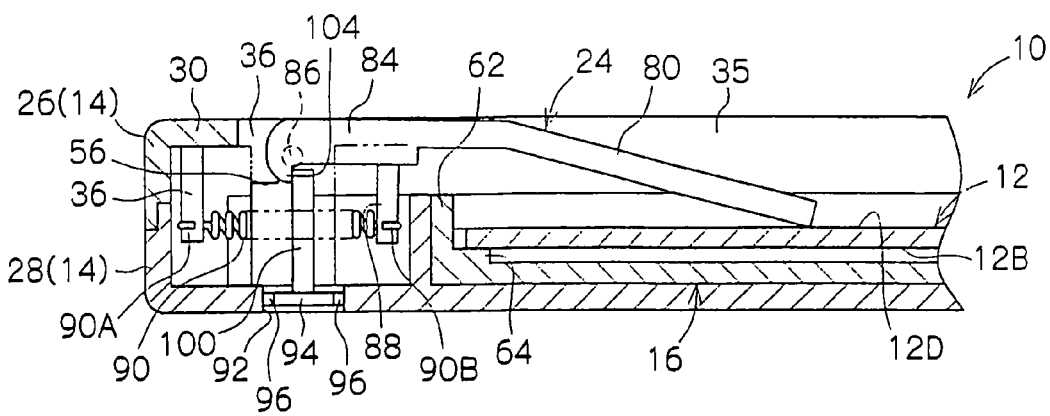
FIGS. 8A to 8C are operation explanatory diagrams of the disc retainer provided to the disc cartridge according to the embodiment of the invention.
Figure 8B:
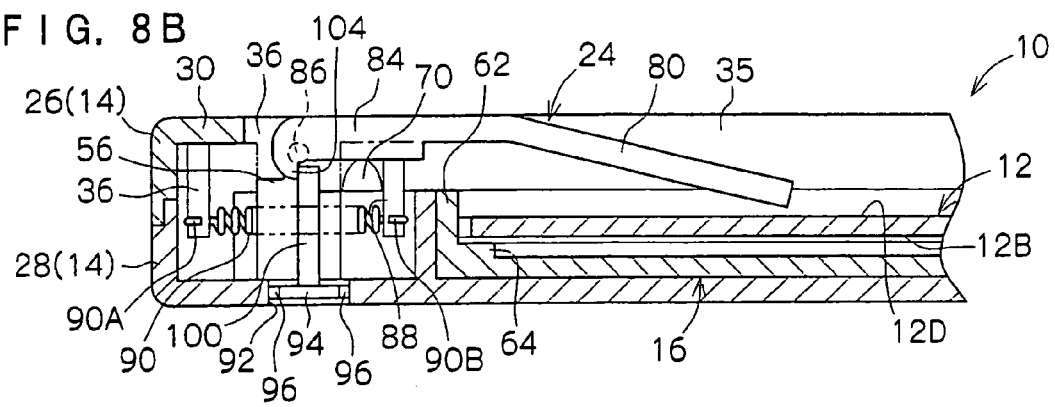
Figure 8C:
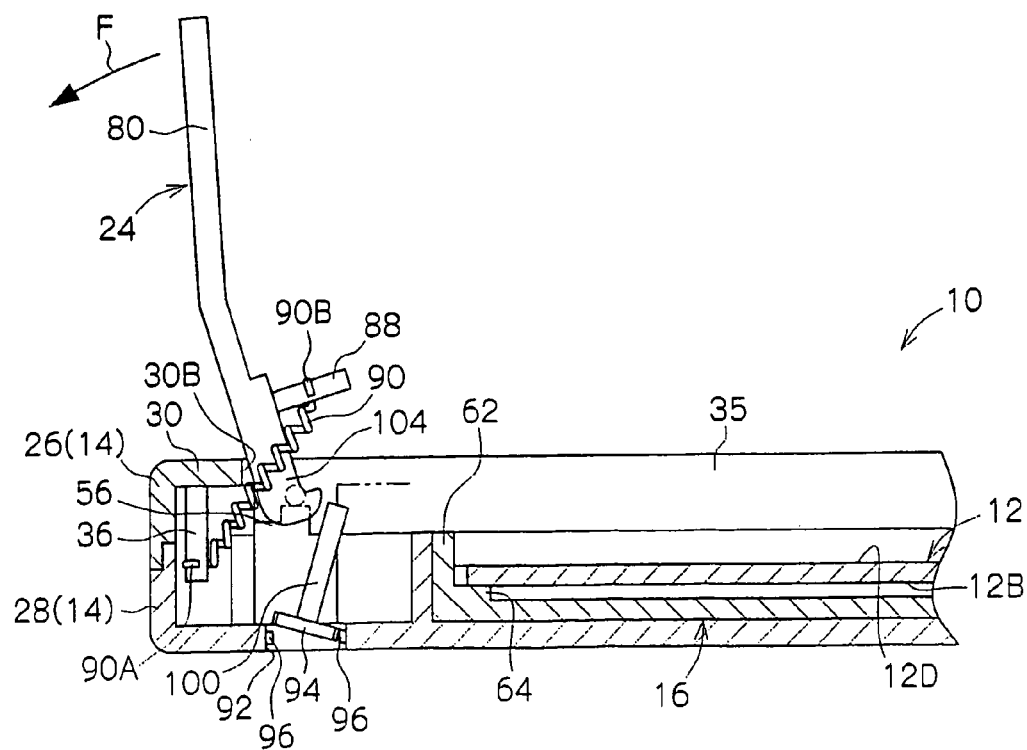

That is to say, the protruded position of the lock pin 88 is regulated as mentioned below. When the disc retainer 24 moves rotationally (rotates) and is in the maximum rotational position where the external surface (upper surface) of the arm 82 touches the rear edge of the notched portion 30B formed on the top panel 30, as shown in FIG. 8C, the coil spring 90 enters the notched portion 30B formed widely. Thereafter, the urging force of the coil spring 90 exceeds the shafts 86 so as to direct towards an arrow F.

With such a constitution, the disc retainer 24 is temporarily maintained in the maximum rotational position (opened position), so as to be capable of being maintained in three states (postures) including a preservation position (closed position) where the disc medium 12 is preserved, an operating position where the disc medium 12 can rotate, and a taking-out position where the disc medium 12 can be taken out. As shown in FIGS. 8A and 8B, the disc retainer 24 is constituted so as not to protrude from the upper surface of the case 14 (top panel 30) from side view in the positions (particularly the operating position) other than the taking-out position where the disc medium 12 is taken out.

As shown in FIGS. 8A to 8C, a touching portion 104 is provided on the inner surface (lower surface) of the arm 84. The touching portion 14 is positioned on the rear side of the pillar portion 100 provided at the lower shell 28 in a state that the end of the retaining portion 80 retains the non-recording surface 12D of the disc medium 12, and is extended along the protruded direction of the pillar portion 100. When the disc retainer 24 is moved rotationally (rotated), the touching portion 104 can touch the pillar portion 100, and when the disc retainer 24 is moved rotationally (rotated) to the opened position in a state that the touching portion 104 touches the pillar portion 100, the pillar portion 100 is pressed so as to be slanted.

At this time, the thin portions 96 which bridge the inner peripheral edge of the detecting hole 92 and the external peripheral edge of the cover 94 provided on the base (end) of the pillar portion 100 are broken, and the cover 94 is lifted up, so that the detecting hole 92 closed by the cover 94 is opened. All the plural of the thin portions 96 are broken and the cover 94 and the pillar portion 100 are separated completely from the lower shell 28, so that the cover 94 and the pillar portion 100 can be taken out of the case 14 through the taking-out hole 102 (see FIG. 3).

On the other hand, the drive device can be further thinned in comparison with a case in which the disc retainer 24 which protrudes from the upper surface of the case 14 (top panel 30) particularly in the operating position is used. Even when the drive device has a vertical loading aperture (the disc cartridge 10 in a vertical posture is loaded into the drive device) so as to be driven and rotated, the disc medium 12 can be suitably prevented from dropping off.

The provision of the disc retainer 24 to the rear side of the case 14 is preferable because when the disc cartridge 10 is loaded into the drive device, the disc retainer 24 can be used as a handle for holding the disc cartridge 10.

When the upper shell 26 is laid over the lower shell 28 so as to assemble the case 14, the shafts 86 are held by the shaft receiving portions 56 and the shaft retainers 36 rotatively. For this reason, after the case 14 is assembled, the disc retainer 24 cannot be separated from the case 14. That is to say, when the disc retainer 24 can be easily separated from the case 14 even after the assembly of the case 14, a user possibly lose it. Since the disc retainer 24, however, cannot be separated from the case 14 as long as the case 14 is not disassembled, a trouble such that it is lost does not arise.

In order to make the user easily recognize the operating function of the disc retainer 24, at least suitable characters may be marked on the upper surface of the disc retainer 24, the disc retainer 24 may have a different color from the case 14, or patterns may be formed on the disc retainer 24. Any identifying portion different from the above ones may be formed so that the user can easily recognize the disc retainer 24.

The operation of the disc cartridge 10 having the above constitution is explained below.

Figure 9:
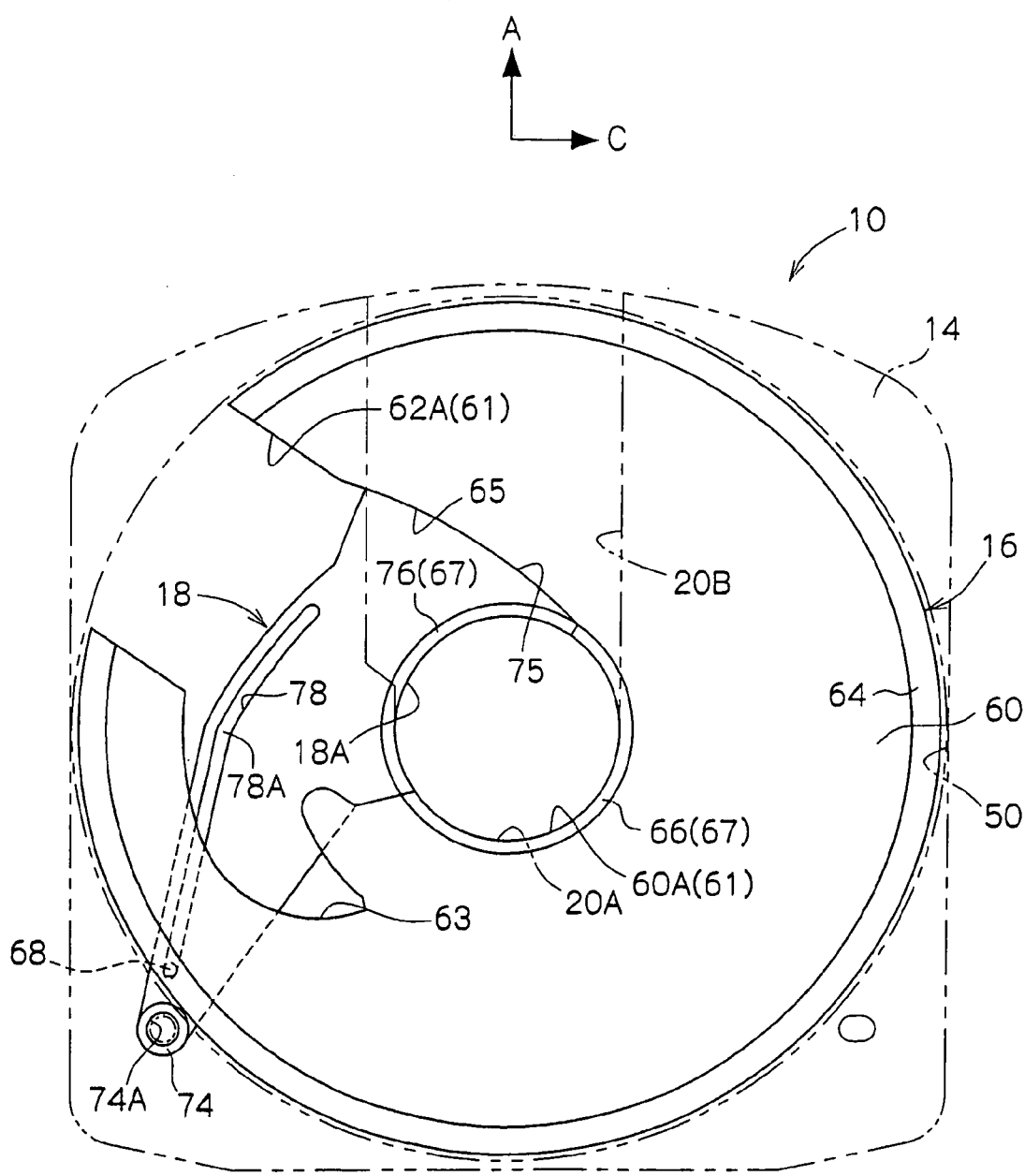
FIG. 9 is an operation explanatory diagram of a first shutter member and a second shutter member composing the disc cartridge according to the embodiment of the invention.

FIGS. 9 to 14 are plan views illustrating a state that the upper shell 26 and the disc medium 12 are removed. As shown in FIG. 9, when the disc cartridge 10 is not used (disc medium 12 is preserved), the recording/reproducing head window 20B is closed by the inner rotor 16 and the second shutter member 18.

That is to say, the abutting portions 65 and 75 of the inner rotor 16 and the second shutter 18 abut against each other, so as to close the recording/reproducing head window 20B. It is preferable that the abutting portions 65 and 75 are formed into the taper surfaces so as to be capable of being overlapped with each other. As a result, dust can be securely prevented from entering the case 14.

At this time, when the side surfaces of the inner peripheral receiving portions 66 and 76 touch each other so that they are formed into a circular shape. The engagement protrusion 68 of the inner rotor 16 is inserted into the concave portion 54 (see FIG. 3) of the lower shell 28 through the rear end side of the guide hole 78 of the second shutter member 18.

Figure 7A:
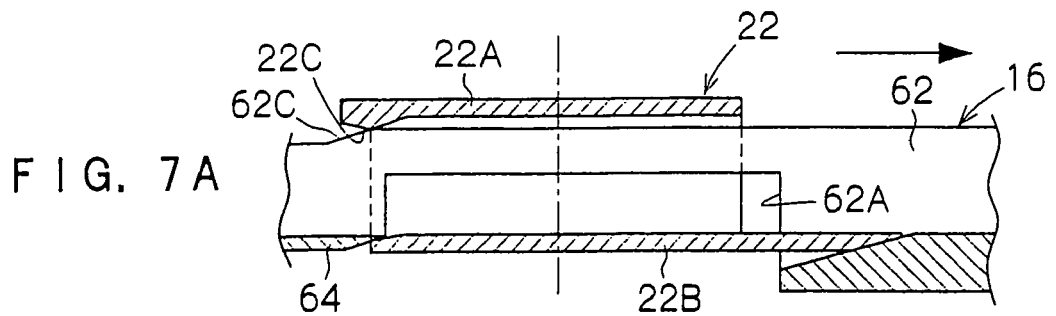
FIGS. 7A to 7D are operation explanatory diagrams of a disc receiver provided to the disc cartridge according to the embodiment of the invention.
Figure 7B:
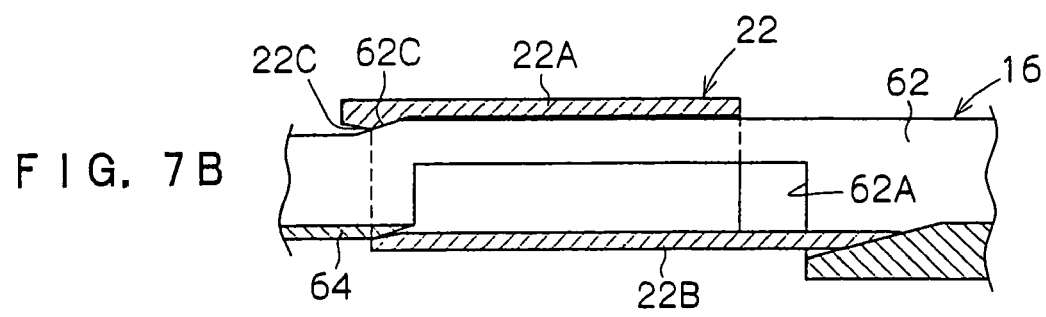
Figure 7C:
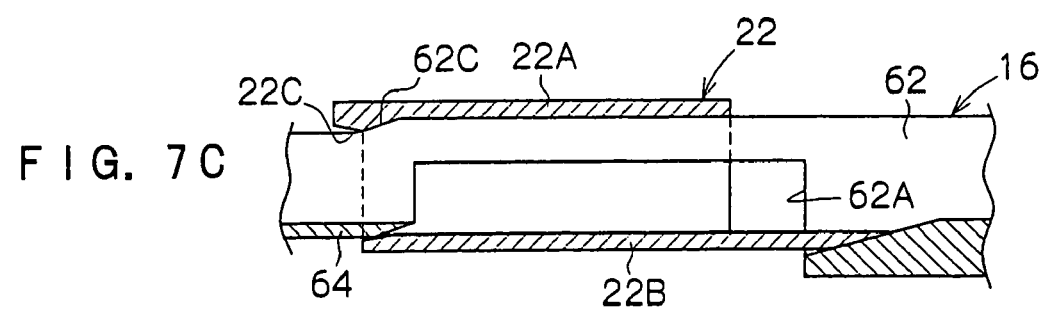
Figure 7D:
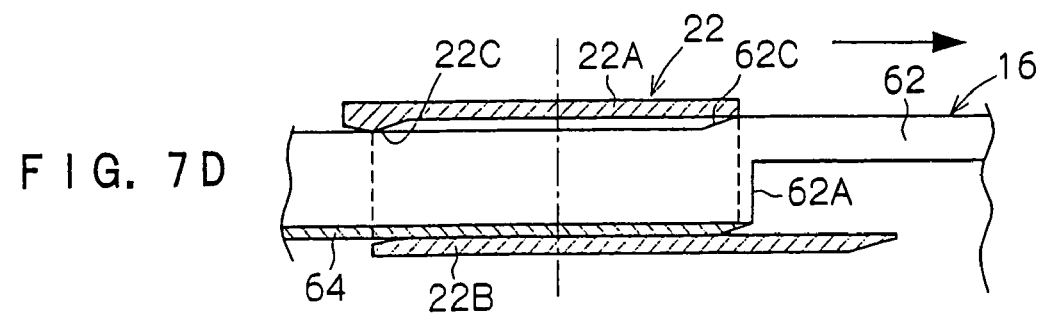

As shown in FIG. 7A, when the recording/reproducing head window 20B is closed, the cam protrusion 22C is supported to the upper surface of the circular wall 62, so that the disc receiver 22 in the rising position closes the notched portion 62A. The lower wall 22B of the disc receiver 22 covers a notched part of the external receiving portion 64, and the disc receiver 22 as well as the external receiving portion 64 support the external peripheral edge of the disc medium 12.

As shown in FIGS. 3 and 9, therefore, when the recording/reproducing head window 20B is closed, the disc medium 12 is housed in the housing portion 57 with the chucking area 12C being supported by the inner peripheral receiving portions 66 and 67 and the external peripheral edge being supported by the external peripheral receiving portion 64 and the lower 22B of the disc receiver 22. As a result, the recording surface 12B is blocked off completed from the outside.

That is to say, since the disc cartridge 10 is provided with the disc opening 35, dust or the like adheres to the non-recording surface 12D of the disc medium 12. When the disc cartridge 10 is not used, however, the inner rotor 16 and the second shutter member 18 close the recording/reproducing head window 20B. For this reason, dust or the like does not adhere to the recording surface 12B, and moisture or the like does not enter.

As shown in FIGS. 1 and 8A where the upper shell 26 and the disc medium 12 are installed, when the disc cartridge 10 is not used (the disc medium 12 is preserved), the disc retainer 24 retains the non-recording surface 12D of the disc medium 12.

That is to say, the right and left ends of the retaining portion 80 press and hold the external peripheral edge of the disc medium 12 on the non-recording surface 12 of the disc medium 12. The disc medium 12, therefore, does not drop off from the disc opening 35 and does not jounce in the housing portion 57.

Such a disc cartridge 10 is loaded into the drive device so that recording or reproducing is carried out. When, however, the disc cartridge 10 is loaded into the drive device through the loading aperture, the inner rotor 16 and the second shutter member 18 move rotationally (rotate) (rotate) so that the recording/reproducing head window 20B is opened, and the locating pins (not shown) are inserted into the locating holes 44A and 46A, so that the disc cartridge 10 is located in the drive device.

Figure 10:
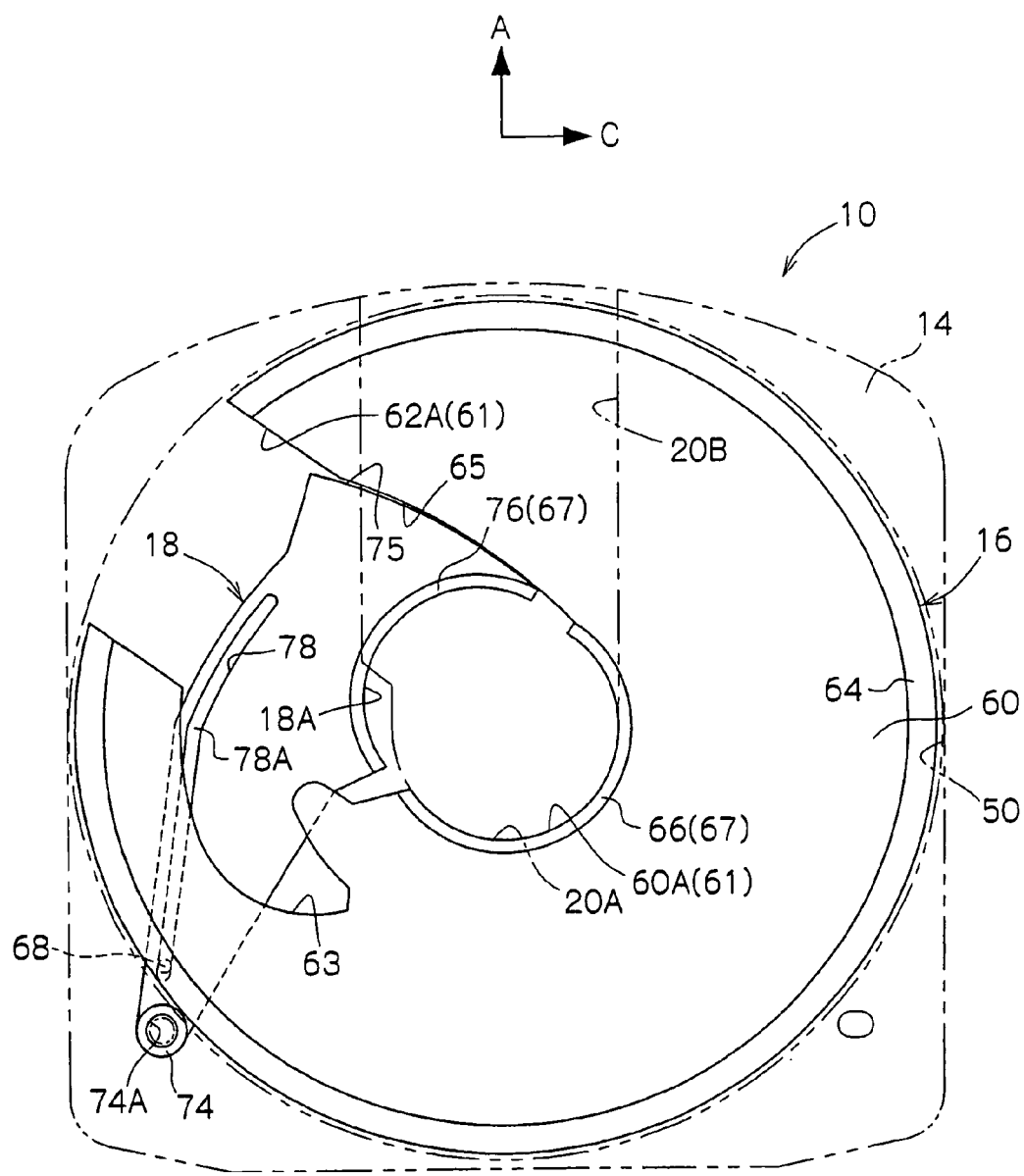
FIG. 10 is an operation explanatory diagram of the first shutter member and the second shutter member composing the disc cartridge according to the embodiment of the invention.

That is to say, as shown in FIGS. 3 and 10, an opening/closing member (not shown) of the drive device is engaged with the operating protrusion 72 protruded from the front end of the shutter operating window 52. When the operating protrusion 72 is moved to the rear side of the case 14, the inner rotor 16 starts to move rotationally (rotate) to a clockwise direction along the inner wall 50 about the hub hole 20A. As a result, the abutting portions 65 and 75, and the side surfaces of the inner peripheral receiving portions 66 and 76 start to be separated from each other.

Figure 11:
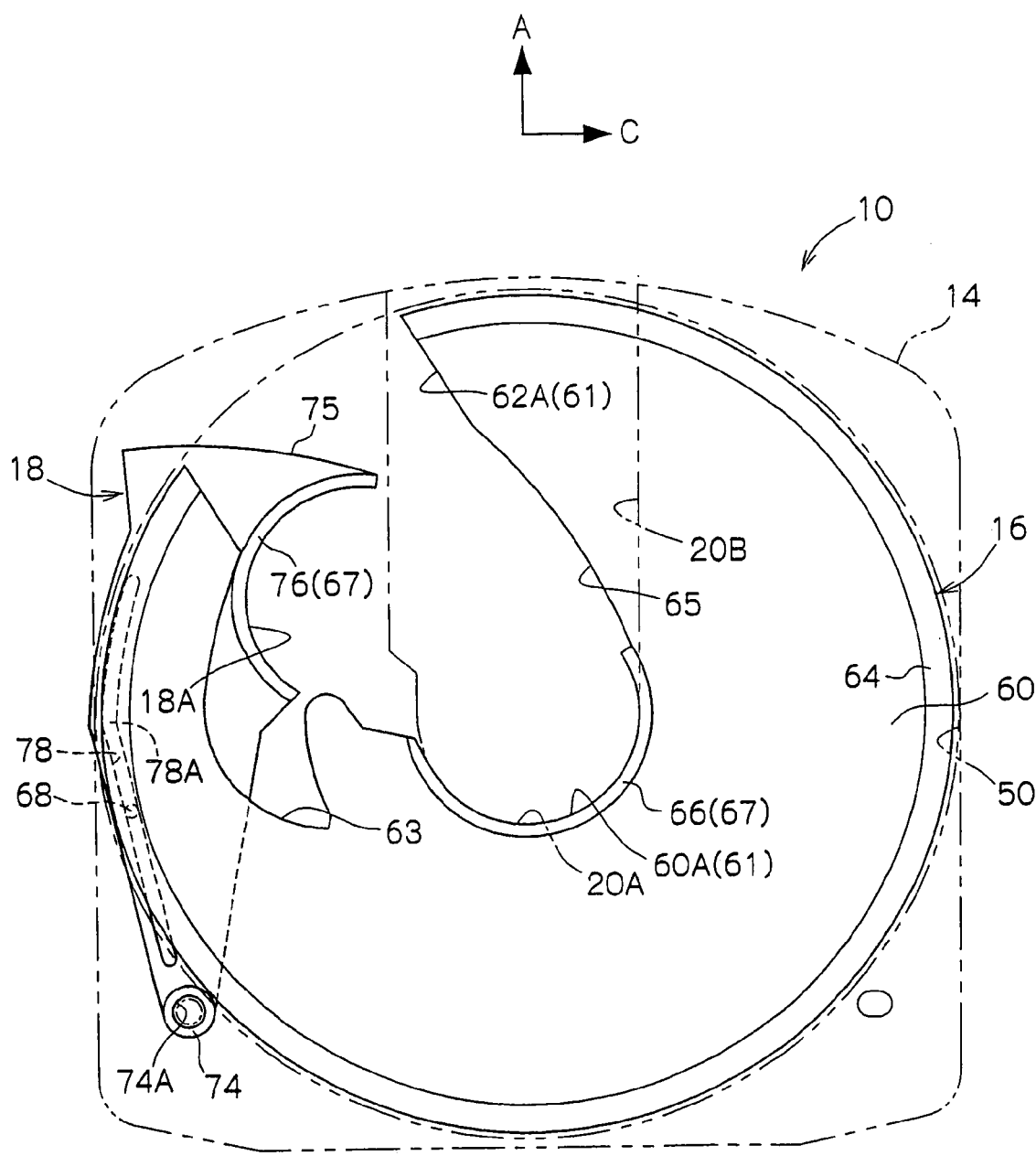
FIG. 11 is an operation explanatory diagram of the first shutter member and the second shutter member composing the disc cartridge according to the embodiment of the invention.

As shown in FIGS. 7A to 7D, the cam protrusion 22C of the disc receiver 22 starts to be engaged with the cam step portion 62C of the circular wall 62, and the disc receiver 22 starts to descend along the guide pins 58 (see FIG. 3). At this time, as shown in FIG. 10 and 11, the engagement protrusion 68 slides in the guide hole 78, and the second shutter member 18 starts to move rotationally (rotate) to a counterclockwise direction about the boss 44.

At this time, since the concave portion 54 has at least a gently slanted surface on a sliding direction where the engagement protrusion 68 goes out, the engagement protrusion 68 smoothly comes out of the concave portion 54 according to the rotational movement of the inner rotor 16 so as to start to slide on the bottom panel 40 of the lower shell 28. That is to say, the inner peripheral receiving portion 76 of the second shutter member 18 is separated from the chucking area 12C with the external peripheral edge of the disc medium 12 being supported to the external peripheral receiving portion 64.

Since the engagement protrusion 68 is formed to be higher than the thickness of the second shutter member 18, at least the vicinity of the engagement protrusion 68 of the inner rotor 16 is lifted by the engagement protrusion 68 to a predetermined height from the second shutter member 18 and the bottom panel 40 of the lower shell 28. As a result, the inner peripheral receiving portion 76 of the second shutter member 18 does not contact with the recording surface 12B so that the second shutter member 18 can move rotationally (rotate) to the counterclockwise direction.

Figure 12:
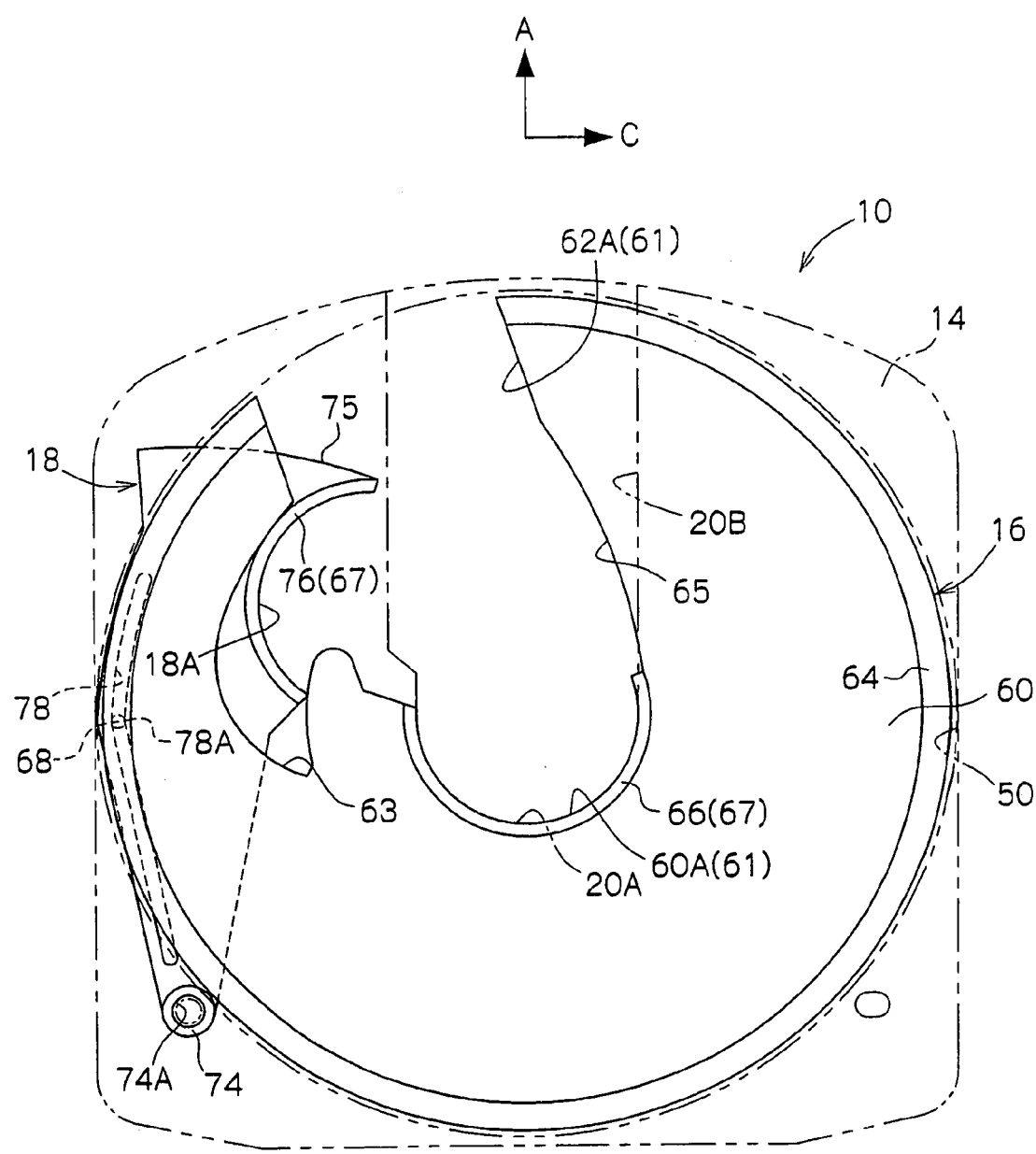
FIG. 12 is an operation explanatory diagram of the first shutter member and the second shutter member composing the disc cartridge according to the embodiment of the invention.

The inner rotor 16, thereafter, moves rotationally (rotates) to the clockwise direction, and accordingly the second shutter member 18 moves rotationally (rotates) to the counterclockwise direction. As a result, the recording/reproducing head window 20B starts to be opened. As shown in FIG. 12, just when the engagement protrusion 68 reaches a bent portion 78A formed on the guide hole 78, the rotational movement of the second shutter member 18 to the counterclockwise direction is stopped.

Figure 13:
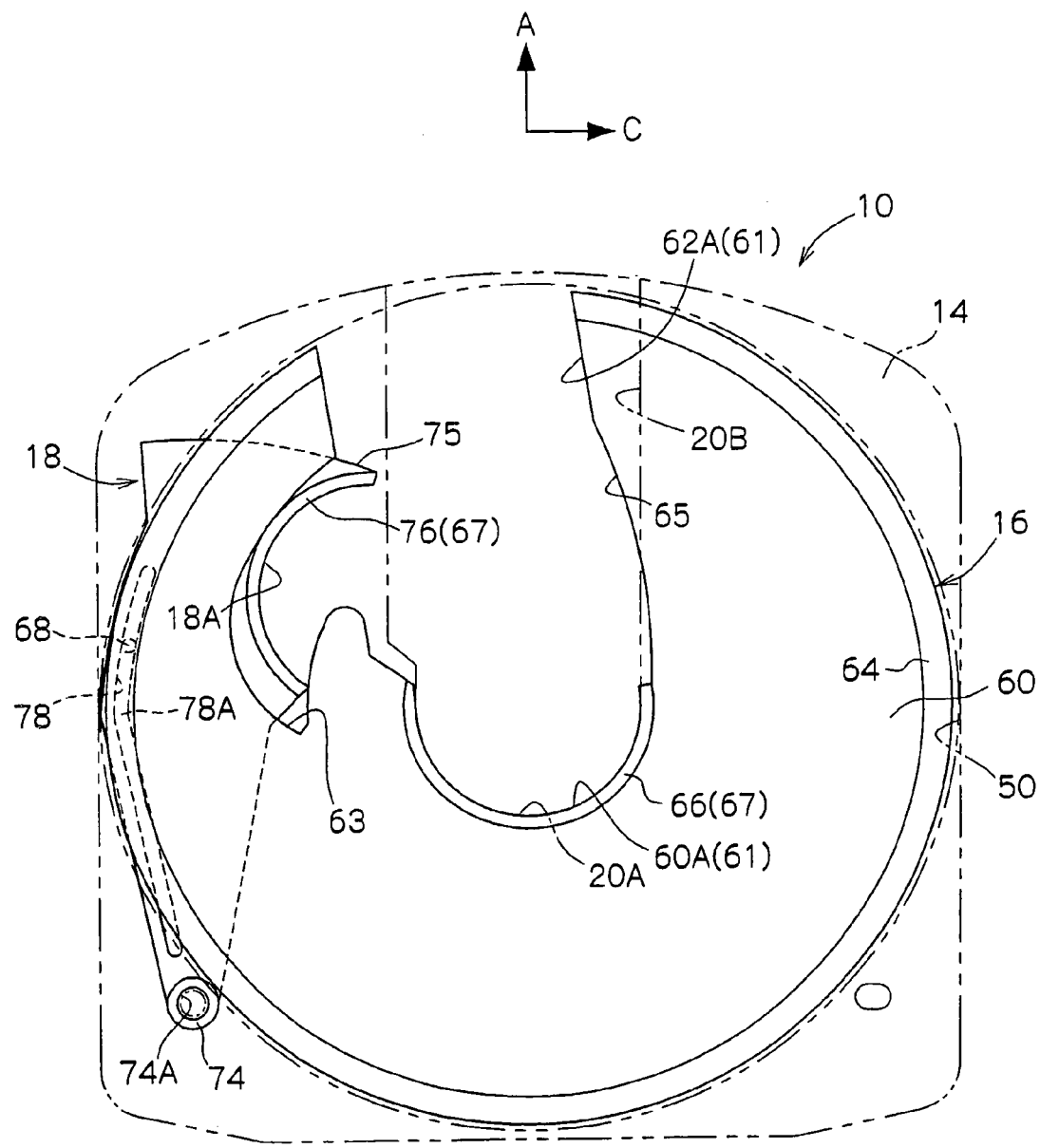
FIG. 13 is an operation explanatory diagram of the first shutter member and the second shutter member composing the disc cartridge according to the embodiment of the invention.

As shown in FIG. 13, the inner rotor 16 still moves rotationally (rotates) to the clockwise direction after the rotational movement of the second shutter member 18 is stopped. Accordingly, the engagement protrusion 68 slides in the guide hole 78. As shown in FIG. 14, when the engagement protrusion 68 reaches the front end of the guide hole 78, the recording/reproducing head window 20B is completely opened.

At this time, the operating protrusion 72 is positioned on the rear end of the shutter operating window 52, and the engagement protrusion 68 is inserted into the concave portion 55 of the lower shell 28. Since at least the sliding direction side of the concave portion 55 where the engagement protrusion 68 enters is the gently slanted surface, the engagement protrusion 68 is smoothly inserted into the concave portion 55.

As a result, the inner rotor 16 (first shutter 60) descends onto the second shutter member 18 and the bottom panel 40 of the lower shell 28, but at this time, the center hole 12A and the chucking area 12C of the disc medium 12 are already held (chucked) by a rotational spindle shaft of the drive device which enters from the hub hole 20A and a chucking member which enters from the disc opening 35. The disc medium 12 itself rises to a rotation allowable position (the external peripheral edge of the disc medium 12 is separated from the external peripheral receiving portion 64). The recording surface 12B of the disc medium 12, therefore, does not contact with the inner peripheral receiving portion 76 of the second shutter member 18.

At this time, as shown in FIG. 8B, the convex portion 70 protruded from the circular wall 62 abuts against the working face of the arm 82 of the disc retainer 24 so as to lift the arm 82. That is to say, the disc retainer 24 is lifted to a predetermined height so that the end of the retaining portion 80 is separated from the non-recording surface 12D of the disc medium 12. The disc retainer 24, therefore, does not interfere with the disc medium 12.

Since the disc retainer 24 is formed into the approximately crescent shape from planar view in the symmetrical manner, it does not interfere with the rotational spindle shaft. That is to say, the rotational spindle shaft chucks (holds) the center hole 12A and the chucking area 12C of the disc medium 12, the disc retainer 24 does not inhibit the chucking (holding).

In such a manner, the recording/reproducing head window 20B is opened, and the retaining (press-holding) of the disc medium 12 by means of the disc retainer 24 is released. As a result, while the disc medium 12 is being rotated by the rotational spindle shaft, information is recorded onto the recording layer 15 (see FIG. 4) or information recorded onto the recording layer 15 is reproduced by the recording/reproducing head of the drive device which enters from the recording/reproducing head window 20B.

On the other hand, when the disc cartridge 10 is taken out of the drive device, the locating pins are pulled out of the locating holes 44A and 46A shown in FIG. 3, so that the locating of the disc cartridge 10 in the drive device is released. The disc cartridge 10 starts to move to a direction where it is discharged from the loading aperture of the drive device by means of a discharge mechanism or the like (not shown) of the drive device.

As a result, the opening/closing member of the drive device moves the operating protrusion 72 protruded form the rear end of the shutter operating window 52 toward the front of the case 14, and the inner rotor 16 starts to move rotationally (rotate) to the counterclockwise direction in FIGS. 14 and 13 along the inner wall 50 about the hub hole 20A. The engagement protrusion 68 positioned on the front end of the guide hole 78 moves along the guide hole 78 to the rear side of the case 14 and simultaneously is disengaged from the concave portion 55 (see FIG. 3). At this time, since the sliding direction of the concave portion 55 from where the engagement protrusion 68 goes out is the gently slanted surface, the engagement protrusion 68 is smoothly disengaged from the concave portion 55.

As shown in FIGS. 11 and 12, when the inner rotor 16 moves rotationally (rotates) to the counterclockwise direction and the engagement protrusion 68 passes through the bent portion 78A of the guide hole 78, the second shutter member 18 starts to move rotationally (rotate) to the clockwise direction. At this time, the holding (chucking) of the disc medium 12 by means of the rotational spindle shaft is already released. Since the engagement protrusion 68, however, is disengaged from the concave portion 55 and is sliding on the bottom panel 40, at least the vicinity of the engagement protrusion 68 of the inner rotor 16 is lifted to a predetermined height. The inner peripheral receiving portion 76 of second shutter member 18, therefore, does not contact with the recording surface 12B.

As shown in FIG. 10, the inner rotor 16 further moves rotationally (rotates) to the counterclockwise direction and the second shutter member 18 further moves rotationally (rotates) to the clockwise direction. As a result, the recording/reproducing head window 20B is being closed, but accordingly the cam protrusion 22C starts to be engaged with the cam step portion 62C as shown in FIGS. 7A to 7D, and the disc receiver 22 starts to lift along the guide pins 58.

As shown in FIG. 9, the abutting portion 75 abuts against the abutting portion 65 and the side surface of the inner peripheral receiving portion 76 buts against the side surface of the inner peripheral receiving portion 66. As a result, the recording/reproducing head window 20B is closed, and the notched portion 62A is closed by the disc receiver 22.

At this time, the engagement protrusion 68 is inserted smoothly into the concave portion 54 (see FIG. 3) due to its slanted surface, and the inner rotor 16 descends to a predetermined height. That is to say, the external peripheral edge of the disc medium 12 is supported by the external peripheral receiving portion 64 and the lower wall 22B of the disc receiver 22, and the chucking area 12C is supported by the inner peripheral receiving portions 66 and 76. As a result, the recording surface 12B is again blocked from the outside, and dust or the like is prevented from adhering to the recording surface 12B.

In such a manner, when the recording/reproducing head window 20B is closed and the operating protrusion 72 is positioned on the front end of the shutter operating window 52 (see FIG. 1), the locating pins are pulled out of the locating holes 44A and 46A so that the locating of the disc cartridge 10 in the drive device is released. The disc cartridge 10 is discharged form the loading aperture of the drive device by the discharge mechanism or the like (not shown) of the drive device.

The above explains the operation when the disc medium 12 in the disc cartridge 10 is loaded into the drive device, but only the disc medium 12 is occasionally loaded according to drive devices. In this case, the disc medium 12 is taken out of the disc cartridge 10. That is to say, the user rotationally moves the disc retainer 24 towards the rear side of the case 14, so that the disc opening 35 is completely opened.

At this time, as shown in FIG. 8C, when the disc retainer 24 is moved rotationally (rotated) until the external surface (upper surface) of the arm 82 of the disc retainer 24 abuts against the rear edge of the notched portion 30A, the position of the disc retainer 24 (maximum rotational position) is maintained temporarily.

That is to say, when the disc retainer 24 moves rotationally (rotates) to the maximum rotational position, the coil spring 90, whose one end (hook 90A) is attached to the lock pin 36 and whose other end (hook 90B) is attached to the lock pin 88, enters the notched portion 30B formed widely according to the rotational movement of the disc retainer 24. As a result, the coil spring 86 exceeds the shaft 86 from beneath to above, and thus its urging force directs towards the arrow F.

The disc retainer 24, therefore, can be temporarily maintained in the maximum rotational position (opened position), thereby easily taking out the disc medium 12 from the disc opening 35.

When the disc retainer 24 is moved rotationally (rotated) to the opened position, the abutting portion 104 of the disc retainer 24 abuts against the pillar portion 100 so as to press and slant the pillar portion 100. As a result, the thin portions 96 which bridge the inner peripheral edge of the detecting hole 92 and the external peripheral edge of the cover 94 are broken. As a result, the detecting hole 92 closed by the cover 94 is opened, and the history such that the disc medium 12 is taken out remains (shown).

When the disc medium 12 is again housed in the case 14, the disc medium 12 is inserted into the disc opening 35, and the disc retainer 24 is moved rotationally (rotated) towards the front side of the case 14. At this time, however, the disc retainer 24 is slightly pushed towards the front side of the case 14, so as to be capable of easily moved rotationally (rotated).

That is to say, when only the disc retainer 24 is slightly pushed, the coil spring 90 easily exceeds the shaft 86 from beneath to above, and thus its urging force acts upon the disc retainer 24 so that it is urged towards the disc medium 12. The disc retainer 24, therefore, can easily retains the disc medium 12 again, so that the disc medium 12 can be again prevented from dropping off from the disc opening 35 and from jouncing in the housing portion 57.

The point of the disc cartridge according to the embodiment is explained below.

As shown in FIG. 8A, the detecting hole 92 is pierced in the lower shell 28, and the cover 94 where the pillar portion 100 is provided upright on its center portion is arranged in the detecting hole 92. The inner peripheral edge of the detecting hole 92 and the external peripheral edge of the cover 94 are bridged by the plural of the thin portions 96. In the state that the end of the retaining portion 80 of the disc retainer 24 presses the non-recording surface 12D of the disc medium 12, the abutting portion 104 is positioned on the rear side of the pillar portion 100 provided on the lower shell 28, and is extended from the inner surface (lower surface) of the arm 84 along the upright installation direction of the pillar portion 100.

As a result, as shown in FIG. 8C, when the disc retainer 24 is moved rotationally (rotated) towards the rear side of the case 14, the abutting portion 104 abuts against the pillar portion 100. When in this state the disc retainer 24 is moved rotationally (rotated) to the opened position, the abutting portion 104 presses and slants the pillar portion 100. At this time, the thin portions 96 are broken, and the cover 94 is lifted up, so that the detecting hole 92 closed by the cover 94 is opened.

When the disc retainer 24 is moved rotationally (rotated) to the opened position, the detecting hole 92 is opened. As a result, a determination can be made whether the disc medium 12 is ever been taken out of the case 14 (taking-out history) based on whether the detecting hole 92 is opened. That is to say, when the detecting hole 92 is closed by the cover 94, the determination is made that the disc medium 12 is not ever been taken out of the case 14. When the detecting hole 92 is opened, the determination is made that the disc medium 12 has been taken out of the case 14.

In the state that the disc medium 12 is housed in the case 14, the quality of the disc medium such as recording/reproducing history is maintained. For this reason, when the disc medium 12 is taken out of the case 14, the quality of the disc medium 12 is not possibly maintained. For this reason, assurance of the quality of the disc medium 12 differs according to whether the disc medium 12 is taken out of the case 14 or not.

In a case of a disc cartridge in which, when a disc medium is taken out, the user is required to open a detecting hole, so as to be capable of determining whether the disc medium is taken out of the case or not (taking-out history) from opening or closing state, it is assumed that the user does not open the detecting hole intentionally or the user forgets to open the detecting hole. As a result, a problem such that the taking-out history of the disc medium becomes inaccurate arises.

On the other hand, in the present embodiment, when the disc retainer 24 is moved rotationally (rotated) to the opened position, the pillar portion 100 is slanted and the thin portions 96 are broken. In conjunction with such an operation for taking out the disc medium 12 from the case 14, the thin portions 96 are automatically broken (deformed irreversibly), thereby preventing the above problem.

Due to the thin portions 96 being broken, the thin portions 96 cannot return to the original state thereof. This prevents the taking-out history from being tampered altered actually the disc medium 12 is taken out of the case 14. The notched portion 98 is provided to each of the end portions of the thin portions 96, so that the thin portion 96 are broken more easily and the cover 94 can be removed form the case 14 through the detecting hole 92 securely.

The taking-out hole 102 is provided to the external peripheral wall 42 of the lower shell 28, and after the cover 94 and the pillar portion 100 are completely separated from the lower shell 28, they can be taken out from the case 14 via the taking-out hole 102. This prevents the cover 94 from again closing the detecting hole 94 falsely. Further, by the structure in which the taking-out hole 102 is provided to the surface different from that in which the detecting hole 92 is provided, a possible misoperation is decreased when the drive device identifies the taking-out history of the disc medium 12, for example.

The abutting portion 104 is extended downward from the inner surface (lower surface) of the arm 84 behind the pillar portion 100 along the protruded direction of the pillar portion 100. As a result, when the disc retainer 24 is moved rotationally (rotated), the abutting portion 104 abuts against the pillar portion 100 so as to press and slant the pillar portion 100, and thus the thin portions 96 ar broken. The invention, however, is not limited to this as long as the determination can be made whether the disc medium 12 is taken out of the case 14 (taking-out history).

For example as shown in FIGS. 15A and 15B, an approximately pillar-shaped engagement protrusion 108 is protruded from the inner surface (lower surface) of the arm 84 positioned on an extended line of a pillar portion 106 when the end of the retaining portion 80 of the disc retainer 24 pressing the non-recording surface 12D of the disc medium 12. An engagement concave portion 108A which is engaged with the end of the pillar portion 106 is provided on a center portion of the engagement protrusion 108, and the end of the pillar portion 106 is press-fitted into to be held in the engagement concave portion 108A when the end of the retaining portion 80 pressing the non-recording surface 12D of the disc medium 12.

A cover 109 is provided integrally at the end of the pillar portion 106. In this case, the cover 109 and the pillar portion 16 are independent of the lower shell 28. As a result, the cover 109 and the detecting hole 92 are not bridged by thin portions, and the cover 109 is simply arranged in the detecting hole 92.

In this state, when the disc retainer 24 is moved rotationally (rotated) towards the rear side of the case 14, the cover 109 abuts against the inner peripheral edge of the detecting hole 92. When, however, the disc retainer 24 is moved rotationally (rotated) to the opened position, the press-fitting between the pillar portion 112 and engagement concave portion 108A of the disc retainer 24 is released, and a pillar portion 112 drops off from the engagement concave portion 108A.

Since the thin portions which bridge the detecting hole 92 and the cover 109 are not present, it is necessary to break the thin portions. For this reason, when the pillar portion 112 press-fitted into the engagement concave portion 108A of the disc retainer 24 is easily separated from the engagement concave portion 108A by rotationally moving the disc retainer 24 to the opened position, the cover 109 and the pillar portion 112 drop off easily via the detecting hole 92. The cover 109 and the pillar portion 112, therefore, can be separated or eliminated from the case 14 securely and easily, and the detecting hole 92 is completely opened, so that the detecting hole 92 is no longer being again closed.

Figure 16A:
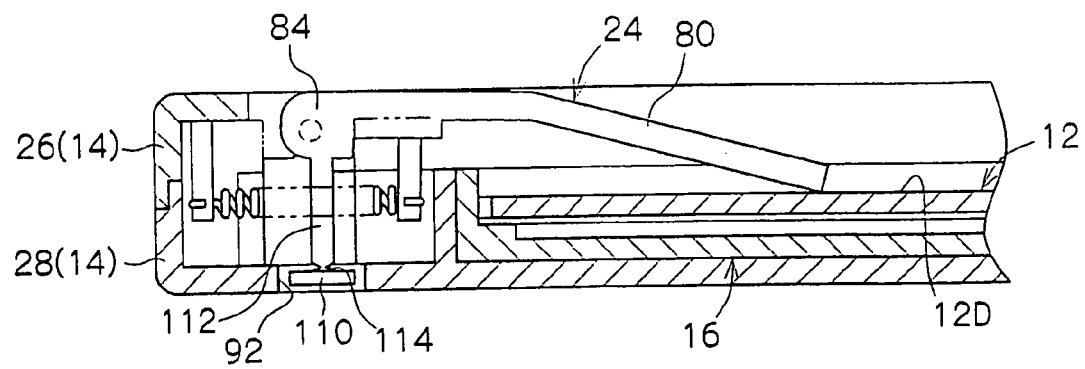
FIGS. 16A and 16B are operation explanatory diagrams illustrating a modified example of the disc retainer of the disc cartridge according to the embodiment of the invention.
Figure 16B:
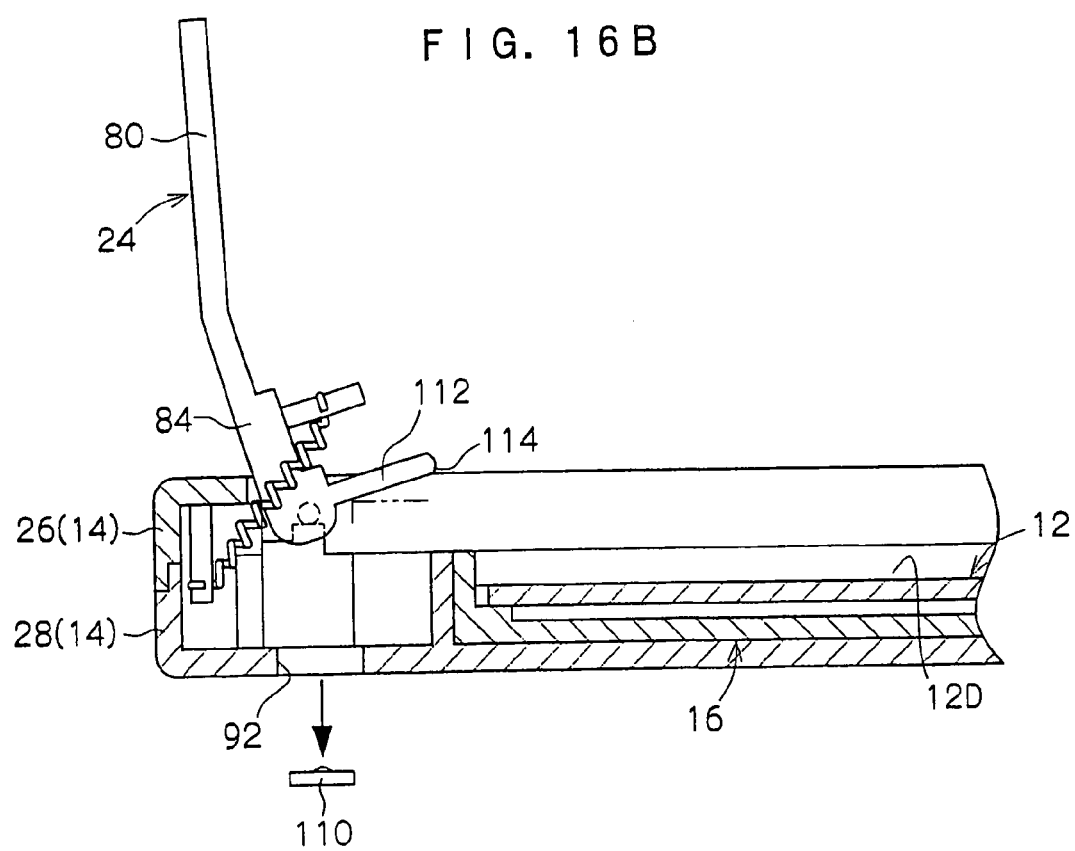

For example, as shown in FIGS. 16A and 16B, the cover 110 and the pillar portion 112 are formed integrally with the disc retainer 24. In this case, since the cover 110 and the pillar portion 1 12 are independent of the lower shell 28, the cover 110 and the detecting hole 92 are not bridged by the thin portions, and the cover 110 is simply arranged in the detecting hole 92.

A notched portion 114 is provided on the base portion of the pillar portion 112, so that the cover 110 and the pillar portion 112 are set to be easily broken. When the disc retainer 24 is moved rotationally (rotated) towards the rear side of the case 14, the cover 100 abuts against the inner peripheral edge of the detecting hole 92. When, however, the disc retainer 24 is rotationally moved to the opened position, the base portion of the pillar portion 112 is broken. As a result, the cover 110 drops off from the detecting hole 92, so that the detecting hole 92 can be opened.

In the embodiment, the determination whether the detecting hole 92 is opened can be determined by visual inspection. The determination may be, however, made by the following manner. Light from an optical sensor or the like provided at the drive device is allowed to pass through the detecting hole 92 as a sensor hole when the disc being loaded, thereby judging whether the detecting hole 92 is opened or not automatically.

In the embodiment, the shutter member 18 and the inner rotor 16 having different shapes are moved to different directions, so that the recording/reproducing head window 20B is opened or closed. The shapes of shutter member and the inner rotor, the driving mechanism and the like are, however, not limited to the embodiment. For example, a pair of shutter members may be supported to the inner rotor, and the shutter members are move parallel with each other according to the rotation of the inner rotor so that the opening is opened or closed.

Further in the embodiment, the diameter of the disc medium 12 is about 120 mm, but the invention is not limited to this. It goes without saying that the invention can be applied also to the disc cartridge 10 having disc medium 12 of any dimension.

What is claimed is:

1. A disc cartridge, comprising:
   a disc medium which is loaded into a drive device, wherein the drive device performs one of recording information into the disc medium and reproducing information from the disc medium;
   a case that houses the disc medium rotatably;
   a disc opening from which the disc medium provided into the case can be taken out, wherein the disc opening is provided on an upper shell of the case; and
   a disc taking-out history detecting portion which is deformed recognizably and irreversibly according to an operation of firstly taking out the disc medium through the disc opening from the case.

2. The disc cartridge according to claim 1, wherein the disc taking-out history detecting portion is a part of the case, which is irreversibly removed according to the taking-out operation.

3. A disc cartridge comprising:
   a disc medium which is loaded into a drive device wherein the drive device performs one of recording information into the disc medium and reproducing information form the disc medium;
   a case that houses the disc medium rotatably;
   a disc opening from which the disc medium provided into the case can be taken out; and
   a disc taking-out history detecting portion which is deformed recognizably and irreversibly according to an operation of firstly taking out the disc medium from the case,
   wherein the disc taking-out history detecting portion is a part of the case, which is irreversibly removed according to the taking-out operation, and
   wherein the case further comprises
      an upper shell at which the disc opening is formed,
      a lower shell to be jointed to the upper shell, and
      a retaining member which rotates between a close position at which the retaining member at least partially closes the disc opening to press the disc medium toward the lower shell and an open position at which the retaining member opens the at least partially closed portion and the disc medium can be taken out, and
   the disc taking-out history detecting portion comprises
      a sealing member provided at the lower shell, and
      a detecting hole closed by the sealing member, and when the retaining member rotates to the open position, the sealing member is irreversibly removed.

4. The disc cartridge according to claim 3, wherein the sealing member comprises a first cover that is bridged to the inner peripheral edge of the detecting hole so as to close the detecting hole; and a first pillar portion that is provided upright on the first cover, and is pressed so as to irreversibly deform the first cover when the retaining member rotates to the open position.

5. The disc cartridge according to claim 4, wherein a notched portion is provided to a connected portion between the first cover and the inner peripheral edge of the detecting hole.

6. The disc cartridge according to claim 4, wherein a taking-out hole through which the broken first cover and the first pillar portion can be taken out is provided at a surface of the case different from a surface of the case at which the detecting hole is provided.

7. The disc cartridge according to claim 3, wherein the sealing member comprises a second pillar portion that extends along an axial direction of the detecting hole and is formed integrally with the retaining member; and a second cover that is formed integrally with an end of the second pillar portion and is smaller than the detecting hole, and is separated from the second pillar portion so as to drop off from the detecting hole when the retaining member rotates to the open position.

8. The disc cartridge according to claim 3, wherein the sealing member comprises a third pillar portion that extends along an axial direction of the detecting hole and is press-fitted into the retaining member to be held at the retaining member; and a third cover that is formed integrally with an end of the third pillar portion and is smaller than the detecting hole, when the retaining member rotates to the open position, the third pillar portion being separated from the retaining member so that the third cover as well as the third pillar portion drop off from the detecting hole.

9. The disc cartridge according to claim 3, further comprising:

a head opening that is provided at the lower shell and allows one of a recording and reproducing head of the drive device to access to the disc medium;

a shutter mechanism that opens and closes the head opening when a first shutter provided in the case coaxially with the disc medium and a second shutter that can rotate around an axis different from that of the first shutter, rotate to opposite directions in a cooperative manner.

10. The disc cartridge according to claim 4, wherein an outer peripheral edge of the first cover and the inner peripheral edge of the detecting hole are bridged by at least one bridging member.

11. The disc cartridge according to claim 7, wherein a notched portion is formed at a connection portion between the second pillar portion and the second cover.

12. The disc cartridge according to claim 8, wherein a recess portion is formed at the retaining member, the end of the third pillar portion being press-fitted into the recess portion.

13. The disc cartridge according to claim 1, wherein the disc opening is formed completely in the upper shell of the case.

14. The disc cartridge according to claim 1, wherein an entire periphery of the disc opening is formed within a top surface of the upper shell of the case.

* * * * *